United States Patent [19]
Hosomi et al.

[11] Patent Number: 6,091,823
[45] Date of Patent: *Jul. 18, 2000

[54] TRANSACTION PROCESSING SYSTEM UTILIZING TELETEXT BROADCASTING SYSTEM AND TERMINAL USED IN THE TRANSACTION PROCESSING SYSTEMS

[75] Inventors: Hironori Hosomi; Makio Nagasaka; Tatsuo Okano, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/797,209

[22] Filed: Feb. 11, 1997

Related U.S. Application Data

[63] Continuation of application No. 08/102,966, Aug. 6, 1993, abandoned.

[30] Foreign Application Priority Data

| Aug. 6, 1992 | [JP] | Japan | 4-210144 |
| Aug. 6, 1992 | [JP] | Japan | 4-210145 |
| Aug. 6, 1992 | [JP] | Japan | 4-210146 |
| Aug. 7, 1992 | [JP] | Japan | 4-211528 |
| Aug. 7, 1992 | [JP] | Japan | 4-211529 |
| Nov. 10, 1992 | [JP] | Japan | 4-299473 |

[51] Int. Cl.$^7$ ............. H04N 7/167; H04N 7/10

[52] U.S. Cl. ............. 380/211; 348/3; 348/7; 348/12; 380/234

[58] Field of Search ............. 348/3, 7, 12; 380/16, 380/20, 234, 211

[56] References Cited

U.S. PATENT DOCUMENTS

| Re. 32,115 | 4/1986 | Lockwood et al. . |
| 3,750,103 | 7/1973 | Angus et al. . |

(List continued on next page.)

FOREIGN PATENT DOCUMENTS

| 0 103 438 | 3/1984 | European Pat. Off. . |
| 0 309 355 | 3/1989 | European Pat. Off. . |

(List continued on next page.)

OTHER PUBLICATIONS

Peyret et al., "Smart Cards Provide Very High Security and Flexibility in Subscribers Management," *IEEE Transactions on Consumer Electronics*, vol. 36, No. 3, Aug. 1990, New York, NY, pp. 744–752.

*Patent Abstracts of Japan*, vol. 13, No. 213 (E–759) May 18, 1989 & JP–A–01 025 659 (Fujitsu) Jan. 27, 1989.

*Patent Abstracts of Japan*, vol. 16, No. 264, (E–1370) Jun. 15, 1992 & JP–A–04 065 790 (Oki Electric Ind Co) Mar 2, 1992.

*Primary Examiner*—Stephen C. Buczinski
*Attorney, Agent, or Firm*—Staas & Halsey LLP

[57] ABSTRACT

A transaction processing system includes a broadcasting station broadcasting a television signal and a teletext signal, the teletext signal including service information concerning transactions, a home-use terminal, a television set connected to the home-use terminal, a transaction processing center, and a communications network connecting the home-use terminal and the transaction processing center to each other. The home-use terminal includes a first unit for receiving the television signal and the teletext signal and for displaying an image of the television signal and an image of the teletext signal on the television set, and a second unit for generating a request for a desired transaction that is one of the transactions contained in the teletext signal broadcasted by the broadcasting station and including information concerning the desired transaction, and a third unit for communicating with the transaction processing center via the communications network, the request for the desired transaction being sent to the transaction processing center via the communications network. The transaction processing center includes a fourth unit for checking the request for the desired transaction in order to determine whether or not the request for the desired transaction is acceptable.

48 Claims, 22 Drawing Sheets

U.S. PATENT DOCUMENTS

| | | |
|---|---|---|
| 4,361,848 | 11/1982 | Poignet et al. . |
| 4,536,791 | 8/1985 | Campbell et al. . |
| 4,599,647 | 7/1986 | George et al. . |
| 4,734,858 | 3/1988 | Schlafly ................................. 364/408 |
| 4,928,177 | 5/1990 | Martinez ................................. 358/142 |
| 5,077,607 | 12/1991 | Johnson et al. . |
| 5,119,188 | 6/1992 | McCalley et al. ........................ 358/86 |
| 5,144,663 | 9/1992 | Kudelski et al. ........................ 380/16 |
| 5,200,823 | 4/1993 | Yoneda et al. . |
| 5,237,610 | 8/1993 | Gammie et al. ......................... 380/10 |
| 5,270,809 | 12/1993 | Gammie et al. . |
| 5,357,276 | 10/1994 | Banker et al. ............................. 348/7 |

FOREIGN PATENT DOCUMENTS

| | | |
|---|---|---|
| 0 401 873 | 12/1990 | European Pat. Off. . |
| 57-083984 | 5/1982 | Japan . |
| 57-164684 | 10/1982 | Japan . |
| 58-075989 | 5/1983 | Japan . |
| 60-126764 | 7/1985 | Japan . |
| 61-72486 | 4/1986 | Japan . |
| 61-281633 | 12/1986 | Japan . |
| 62-120768 | 6/1987 | Japan . |
| 62-171071 | 7/1987 | Japan . |
| 1-025659 | 1/1989 | Japan . |
| 1-123361 | 5/1989 | Japan . |
| 1-240975 | 9/1989 | Japan . |
| 2-110663 | 4/1990 | Japan . |
| 2-196584 | 8/1990 | Japan . |
| 2-260151 | 10/1990 | Japan . |
| 4-29295 | 1/1992 | Japan . |
| 5-6467 | 1/1993 | Japan . |

FIG. 11A

```
PROMPT REPORT OF
STOCK PRICE

STOCK A IN X MARKET      690YEN!
```

FIG. 11B

```
PROMPT REPORT OF
BASEBALL

A TEAM  1  ——  0  B TEAM
```

FIG. 11C

```
TRAFFIC INFORMATION

A-ROAD CONGESTION    1.5km
```

TRANSACTION PROCESSING SYSTEM UTILIZING TELETEXT BROADCASTING SYSTEM AND TERMINAL USED IN THE TRANSACTION PROCESSING SYSTEMS

This application is a continuation, of application Ser. No. 08/102,966, filed Aug. 6, 1993, now abandoned.

BACKGROUND OF THE INVENTION

Field of the Invention

The present invention generally relates to a transaction processing system using a home-use terminal in which transaction such as stock dealings, betting on a race-horse, or advance booking can be carried out at home. More particularly, the present invention is concerned with a transaction processing system utilizing a teletext broadcasting system and a home-use terminal used in such a transaction processing system.

Recently, there has been considerable activity in the development of a transaction processing system in which a user can carry out transaction at home by means of a less-expensive, simple, home-use terminal. In such a transaction processing system, the home-use terminal of the user is connected to a host computer of a transaction processing center of a company via a public communications line. Service information necessary for a transaction is given to the home-use terminal from the host computer, and the user sends the company a transaction request in response to the received information. For example, in stock dealings, the company sends the user information concerning a movement in the stock market, such as a fluctuation in prices of stocks. Then, the user sends the company a request for buying or selling of a desired stock upon seeing the received information.

In a transaction processing system as described above, service information necessary for transaction is sent to the user more times than trading is actually carried out. In many cases, the number of times that service information necessary for transaction is sent to the user is several tens times the number of times that transaction is actually carried out. For example, in a mail-order system, information request is repeatedly carried out many times until the user receives information concerning a desired item. It is to be noted that such information given to the user from the transaction processing center of the company before the actual transaction is offered free. In actuality, the company provides a large number of communications lines in order to smoothly provide the users with service information necessary for transaction. This increases the cost of transaction and affects the viability of the company.

SUMMARY OF THE INVENTION

It is a general object of the present invention to provide a transaction processing system in which the above disadvantages are eliminated.

A more specific object of the present invention is to provide a transaction processing system in which the cost of providing the users with service information necessary for a transaction can be reduced.

The above objects of the present invention are achieved by a transaction processing system comprising: a broadcasting station broadcasting a television signal and a teletext signal, the teletext signal including service information concerning transactions; a home-use terminal; a television set connected to the home-use terminal; a transaction processing center; and a communications network connecting the home-use terminal and the transaction processing center to each other. The home-use terminal comprises: first means for receiving the television signal and the teletext signal and for displaying an image of the television signal and an image of the teletext signal on the television set; second means for generating a request for a desired transaction that is one of the transactions contained in the teletext signal broadcasted by the broadcasting station and including information concerning the desired transaction; and third means for communicating with the transaction processing center via the communications network, the request for the desired transaction being sent to the transaction processing center via the communications network. The transaction processing center comprises fourth means for checking the request for the desired transaction in order to determine whether or not the request for the desired transaction is acceptable.

The above objects of the present invention are also achieved by a transaction processing system comprising: a broadcasting station broadcasting a television signal and a teletext signal, the teletext signal including service information regarding tickets; a home-use terminal serving as a ticket booking terminal; a television set connected to the home-use terminal; a transaction processing center functioning as a ticket issuing terminal; and a communications network connecting the home-use terminal and the transaction processing center to each other. The home-use terminal comprises: first means for receiving the television signal and the teletext signal and for making an image of the television signal and an image of the teletext signal displayed on the television set; second means for generating a request for booking a desired ticket indicated by the teletext signal broadcasted by the broadcasting station and including information concerning the desired ticket; and third means for communicating with the transaction processing center via the communications network, the request for booking the desired ticket being sent to the transaction processing center via the communications network. The transaction processing center comprises: fourth means for checking the request for booking the desired ticket in order to determine whether or not the request for the desired ticket is acceptable; and fifth means for sending an acknowledgement signal to the home-use terminal when the request for booking the desired ticket is acceptable.

The above objects of the present invention are also achieved by a transaction processing system comprising: a broadcasting station broadcasting a television signal and a teletext signal, the teletext signal including service information concerning transactions; a home-use terminal; a television set connected to the home-use terminal; a transaction processing center; and a communications network connecting the home-use terminal and the transaction processing center to each other. The home-use terminal comprises: first means for receiving the television signal and the teletext signal and for making an image of the television signal and an image of the teletext signal displayed on the television set; second means for generating a request for a desired transaction that is one of the transactions contained in the teletext signal broadcasted by the broadcasting station and including information concerning the desired transaction; third means for communicating with the transaction processing center via the communications network, the request for the desired transaction being sent to the transaction processing center via the communications network; and fourth means for reading an application-for-admission program from a card and for sending the transaction processing center information necessary for applying for admission to become a member of the transaction processing system in accordance with the application-for-admission program. The transaction processing center comprises: fifth means for checking the request for the desired transaction in order to determine whether or not the request for the desired transaction is acceptable; sixth means for checking the information for applying for admission in order to determine whether or not an application for admission is acceptable; and seventh means for sending an acknowledgement signal to the home-use terminal when it is determined that the application for admission is acceptable, the acknowledgement signal including a member number, which is recorded on the card by the fourth means.

BRIEF DESCRIPTION OF THE DRAWINGS

Other objects, features and advantages of the present invention will become more apparent from the following detailed description when read in conjunction with the accompanying drawings, in which:

FIGS. 11A, 11B and 11C are diagrams of display screens of the variation shown in FIG. 10;

DESCRIPTION OF THE PREFERRED EMBODIMENTS

Figure 1:
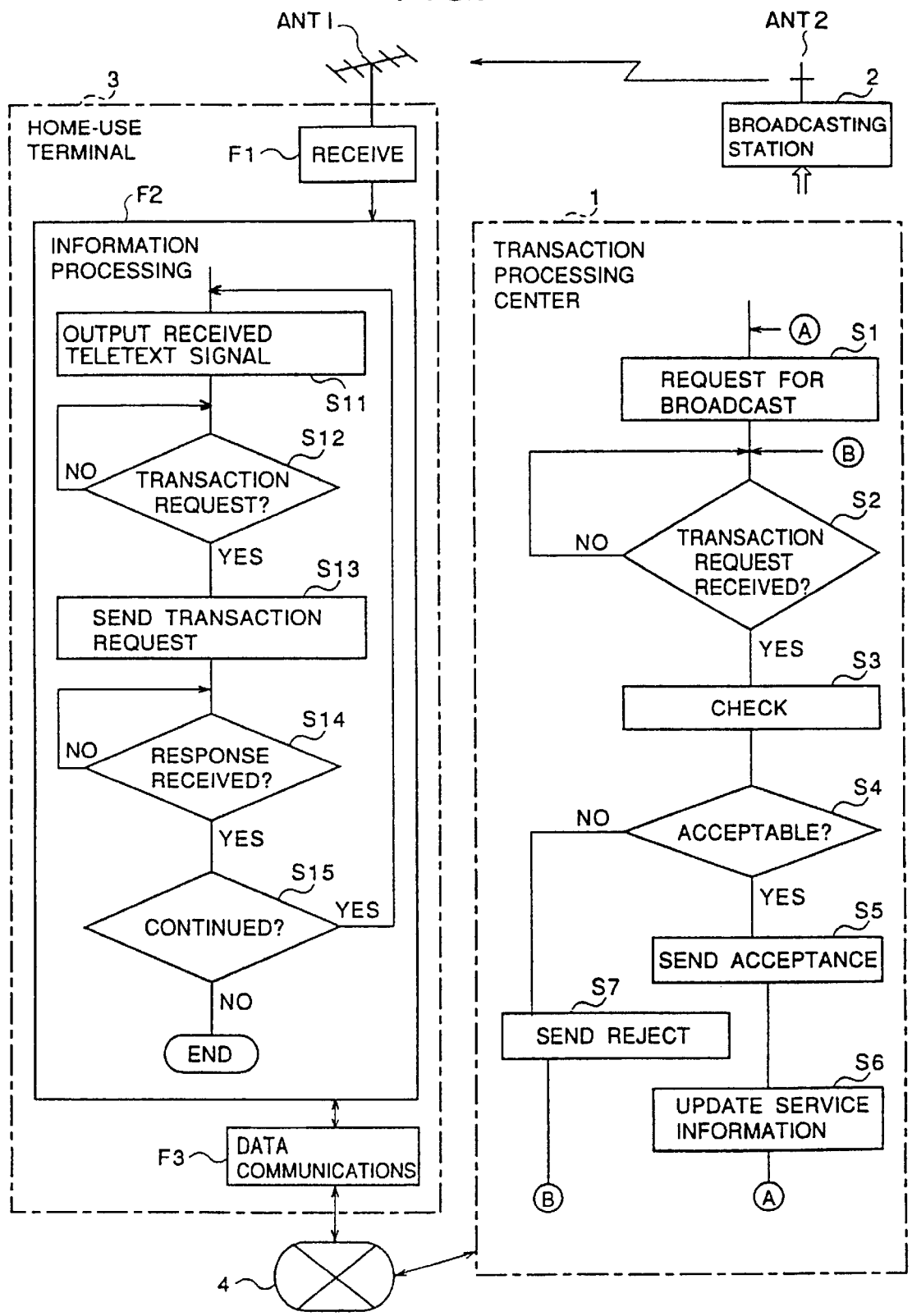
FIG. 1 is a block diagram of the principle of a transaction processing system according to a first embodiment of the present invention.

FIG. 1 shows the principle of a transaction processing system according to a first embodiment of the present invention. The transaction processing system shown in FIG. 1 comprises a transaction processing center 1, a broadcasting station 2 having an antenna ANT2, a home-use terminal having an antenna ANT1, and a public communications line network 4. In actuality, a plurality of home-use terminals are connected to the transaction processing center 1. However, only one home-use terminal 3 is shown in FIG. 1 for the sake of simplicity.

The transaction processing center 1, which is located on a company side, requests the broadcasting station 2 to broadcast a teletext signal common to the users, and waits for transaction requests from the home-use terminals 3 (steps S1 and S2) via the communications line network 4. The teletext signal is broadcasted so that it is superimposed on the television image signal. It is also possible to separately broadcast the television signal and the teletext signal.

If the transaction processing center 1 receives a transaction request from the home-use terminal 3 shown in FIG. 1 (step S2), the transaction processing center 1 checks the content of the transaction request (S3). When it is determined that the transaction request is acceptable (step S4), the transaction processing center 1 informs, via the communications line network 4, the home-use terminal 3 that the transaction request is acceptable (step S5). If the content of service information has been changed due to acceptance of the transaction request, the transaction processing center 1 requests the broadcasting station 2 to update the content of teletext signal to be broadcasted. When it is determined that the transaction request is not acceptable (step S4), the transaction processing center 1 informs, via the communications line network 4, the home-use terminal 3 that the transaction request is rejected (step S7).

The home-use terminal 3 has a teletext signal receiving function F1, an information processing function F2 and a data communications function F3. The teletext signal receiving function F1 receives a teletext signal broadcasted from the broadcasting station 2, and transfers the received teletext signal to the information processing function F2. The information proccessing function F2 provides the user with the received teletext signal by means of a display or printer (step S11), and waits for a transaction request from the user (step S12). When a transaction request is input by means of an input device such as a keyboard, the information processing function F2 sends the transaction request to the transaction processing center 1 via the network 4 (step S13) under the control of the data communications function F3, and waits for a response from the center 1 (step S14). If the user wishes to continue transaction, the function F2 starts the step S11 again.

Service information necessary for a transaction is sent to the users as teletext which is broadcasted by the broadcasting station 2 connected to the transaction processing center 1. That is, it is not necessary for the home-use terminals 3 to individually request service information and for the transaction processing center 1 to separately respond to the respective requests for service information. Hence, it is possible to drastically reduce the number of communications lines connecting the home-use terminals 3 and the transaction processing center 1.

It is possible for the transaction processing center 1 to store particular information provided for the specific users and provide the users such particular information in response to requests from the specific users.

Figure 2:
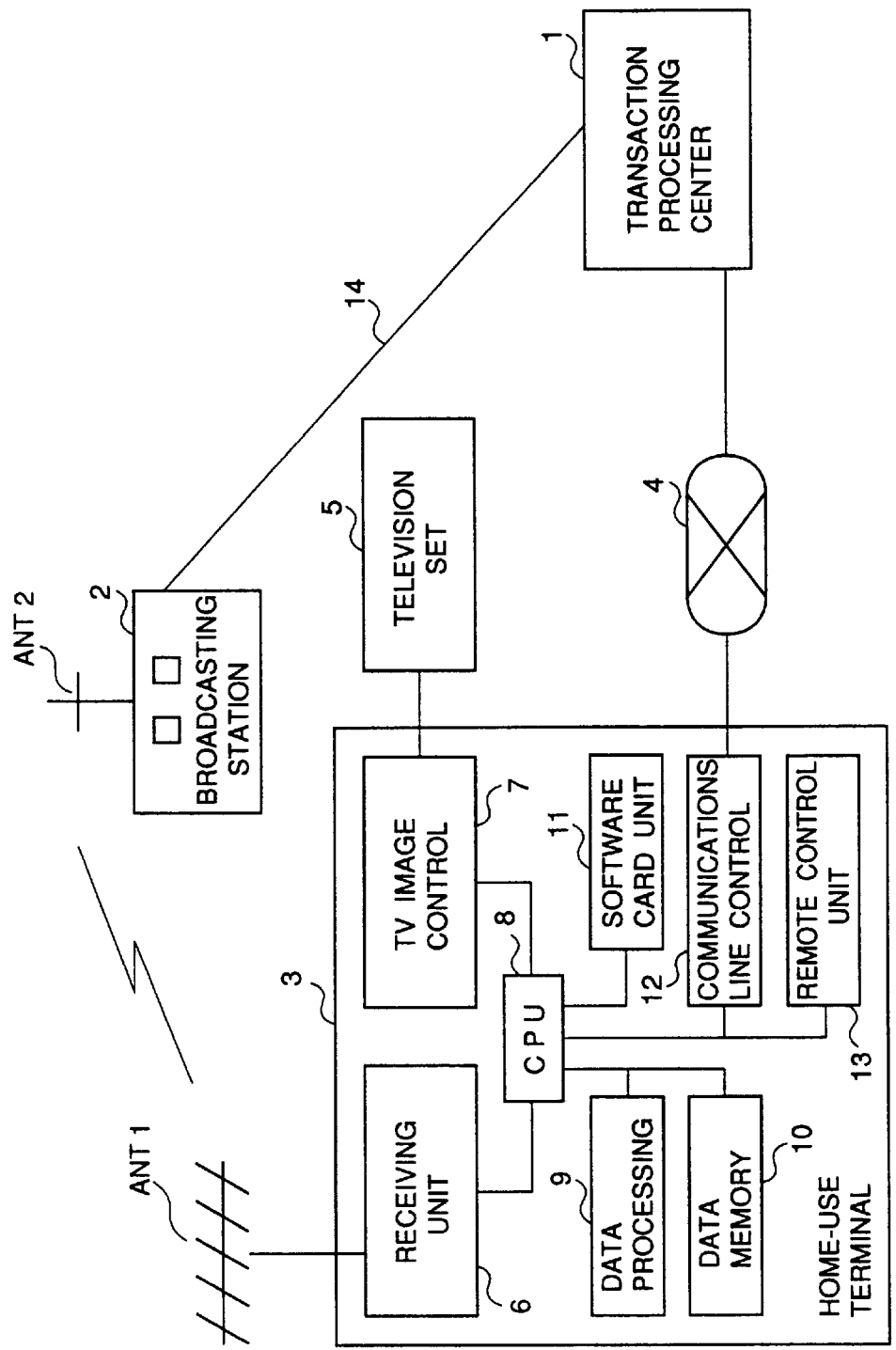
FIG. 2 is a block diagram of a detailed structure of the transaction processing system shown in FIG. 1.

FIG. 2 is a block diagram of the transaction processing system according to the first embodiment of the present invention. In FIG. 2, parts that are the same as those shown in FIG. 1 are given the same reference numbers. The transaction processing center 1 and the broadcasting station 2 are connected to each other by means of a dedicated communications line 14. Service information is sent to the broadcasting station 2 via the dedicated communications line 14. A television set 5 is connected to the home-use terminal 3.

The home-use terminal 3 is made up of a broadcasted television signal/teletext signal receiver unit 6, a television image controller 7, a CPU (Central Processing Unit) 8, a data processing unit 9, a data memory 10, a software card unit 11, a communications line controller 12, and a remote control unit 13. The receiver unit 6 receives television image and audio signals and a teletext signal which are broadcasted by the broadcasting station 2, and separates these signals from each other. The television image controller 7 controls the television set 5 so that either the received television image or an image of the teletext signal (a teletext image signal) is selectively displayed on the television set 5 and further a system initial image screen and a data input screen are displayed thereon. According to the first embodiment, when a software card (member's card) is inserted into the software card unit 13, the CPU 8 automatically selects the teletext image, and sends it to the television set 5. As will be described later, the image of the teletext signal can be displayed so as to be superimposed on the received television image. The CPU 8 integrally controls the operation of the home-use terminal 3. For example, the CPU 8 gives the receiver unit 6 information indicating a channel to be selected in response to an instruction signal from the remote control unit 13, and gives the controller 7 information indicating which picture should be displayed on the television set 5 in response to, for example, an instruction signal from the remote control unit 13.

The data processing unit 9 has a screen editing function. More specifically, teletext service information received via the receiver unit 6 is converted into teletext image data displayable on the television set 7. As will be described later, the received teletext signal may be converted into telop data. The data memory 10 stores the received service information and programs defining the operation of the CPU 8. The software card unit 11 reads data from a software card inserted therein. For example, the software card has a recording medium supported by a flexible card. The data read from the data card describes user information, instructions for specifying particular operations, a program for controlling a corresponding transaction, or a program designed to extend the function of the home-use terminal 3. The data card unit 11 is capable of recording data on the data card. A plurality of software cards are provided for different types of transactions. For example, software cards for use in stock dealings, betting on a race-horse, or advance booking are provided.

The communications line controller 12 controls communications with the transaction processing center 1 via the public communications line network 4. The remote control unit 13 includes a remote controller and a processing circuit for processing signals received from the remote controller. For example, information indicating a channel to be selected is input to the home-use terminal 3 via the remote control unit 13.

Figure 3:
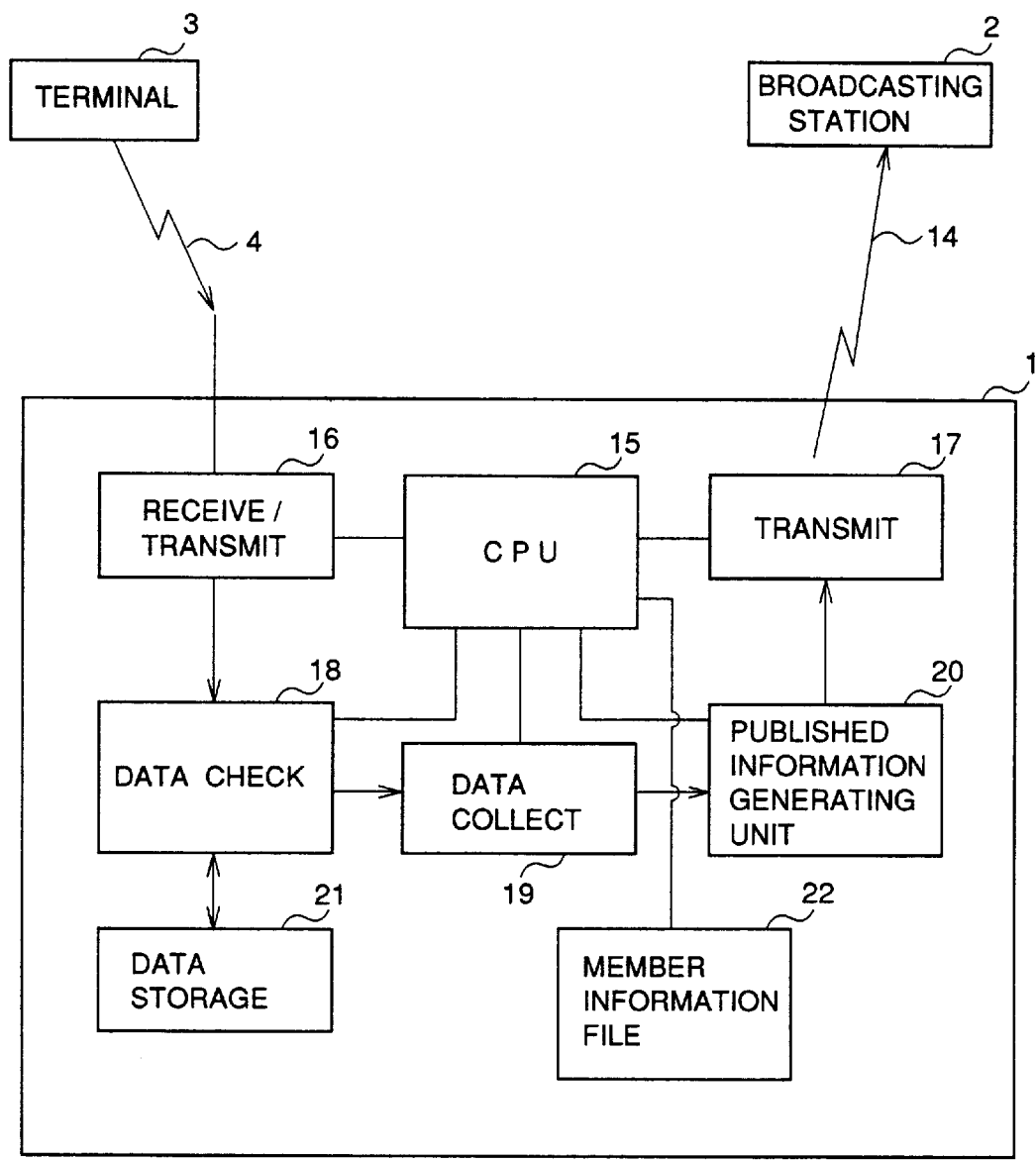
FIG. 3 is a block diagram of a transaction processing center shown in FIGS. 1 and 2.

FIG. 3 is a block diagram of the transaction processing center 1 shown in FIG. 2. The transaction processing center 1 comprises a CPU 15, a receiving/transmitting unit 16, a transmitting unit 17, a data checking unit 18, a data collecting unit 19, a published information generating unit 20, a data storage unit 21, and a member information file 22. The CPU 15 integrally controls the operation of the transaction processing center 1. The receiving/transmitting unit 16 receives signals transmitted by the terminal 3 via the network 4, and transmits signals to the terminal 3. The data check unit 18 checks the received data according to various checking functions, which will be described later. The data storage unit 21 stores data from the data checking unit 18. The data collecting unit 19 collects data from the data checking unit 18. The published information generating unit 20 generates a teletext signal from the data received from the data collecting unit 19. The transmitting unit 17 transmits the teletext signal from the generating unit 20 to the broadcasting station 2 via the dedicated communications line 14. The member information file 22 stores information concerning members (users) of the services provided by the transaction processing center 1.

The broadcasting station 2 can perform satellite broadcasting, UHF broadcasting or VHF broadcasting.

Figure 4A:
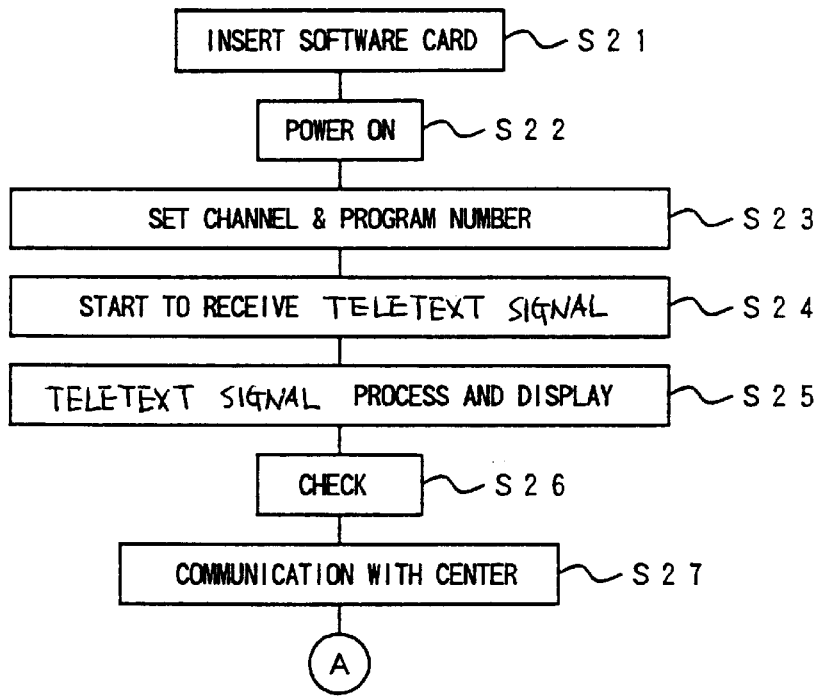
FIGS. 4A and 4B are flowcharts of an operation of the first embodiment of the present invention.

A description will now be given, with reference to FIGS. 4A and 4B, of the operation of the first embodiment of the present invention. The following operation relates to a purchasing transaction of goods, stocks, tickets or the like.

The user inserts the software card into the software card unit 11 shown in FIG. 2 (step S21). If the user wishes to carry out a transaction of stock dealings, a corresponding software card is inserted into the software card unit 11. The software card stores information specifying a channel via which the teletext signal is broadcasted, and information indicating a program number. Various programs corresponding to different types of transactions are provided. If the software card corresponding to stock dealings is inserted into the software card unit 11, the corresponding program number is read therefrom by means of the software card unit 11.

Then, the user turns on a power supply switch (not shown) of the home-use terminal 3 in step S22. In step S23, the CPU 8 of the home-use terminal 3 provides the receiver unit 6 with the information specifying the channel and the program number, the above information being read from the software card. The receiver unit 6 receives the above information, and starts to receive service (teletext) information of the specified program via the specified channel (step S24). When the teletext signal is broadcasted so that it is superimposed on the television image signal, the receiver unit 6 extracts the teletext signal from the television image signal.

Figure 4B:
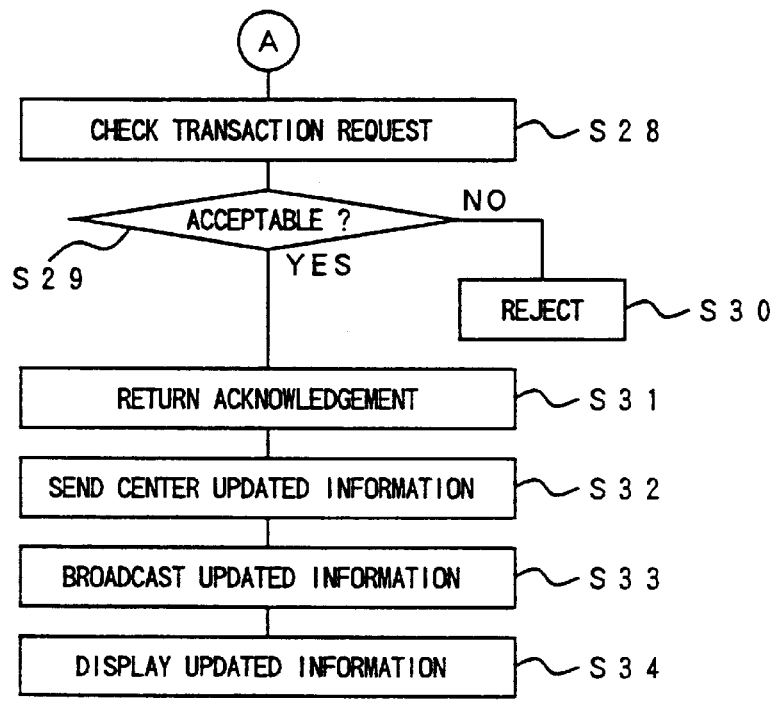
Figure 4C:
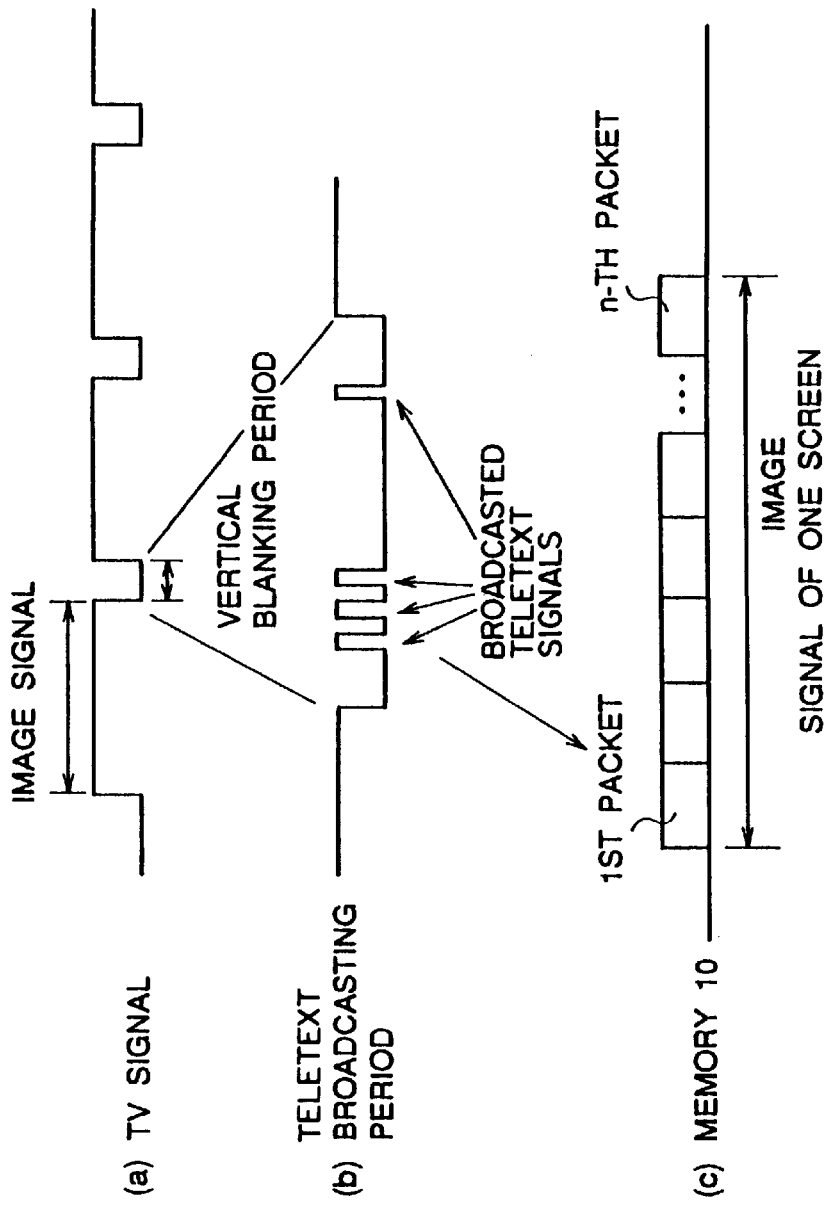
FIG. 4C is a waveform diagram of signals used in the first embodiment of the present invention.

As shown in FIG. 4C, teletext broadcasting signals forming teletext images are inserted into a television signal during a vertical blanking period thereof. The receiver unit 6 extracts these broadcasted teletext signals from the received television signal. The extracted broadcast teletext signals are written into the memory 10 (FIG. 2) as packets, and are grouped so that the grouped broadcasting signals form a full-scale screen image.

The content of the received service information thus stored in the data memory 10 (FIG. 2) in the form of packets is edited by the data processing unit 9 so that the teletext images can be displayed in a predetermined format (step S25). For example, all the packets forming a full-scale screen image are read out and edited so that information concerning items is listed on the screen of the television set 5. Then, the teletext signal is sent to the television set 5 via the television image controller 7 under the control of the CPU 8, and is displayed on the television set 5 (step S25). The user sees the screen of the television set 5 and searches for information concerning a desired item (step S26). It is possible to automatically perform the searching operation by providing the CPU 8 with a transaction condition on a desired item. Such a transaction condition can be input to the CPU 8 by means of, for example, the remote control unit 13.

When the user selects a desired item, the user specifies the desired item by means of the remote control unit 13 (step S27). For example, the cursor is moved to the desired item displayed on the screen of the television set 5, and a transaction request command is input by, for example, pressing a predetermined key of the remote controller. In response to the transaction request command, the CPU 8 starts to communicate with the transaction processing center 1 via the communications controller 12 and the network 4 (step S27) and send necessary information to the transaction processing center 1.

Referring to FIG. 4B, the data checking unit 18 receives the information from the home-use terminal 3 via the network 4 and the receiving/transmitting unit 16, and checks the content of the transaction request (step S28). The check process in step S28 will be described in detail later. When it is determined, in step S29, that the transaction request is acceptable, the CPU 15 shown in FIG. 15 starts a purchase process, and sends an acknowledgement signal to the home-use terminal 3 via the receiving/transmitting unit 16 and the network 4 (step S31). The acknowledgement signal includes acknowledgement information, which is sent to the data processing unit 9 under the control of the CPU 8, and is changed to image data. This image data is then transferred to the television set 5 and is displayed thereon.

When the service information being broadcast to the users should be changed due to, for example, the above transaction, the CPU 15 updates the data stored in the data collecting unit 19. The published information generating unit 20 receives updated data and updates the teletext service information. The CPU 15 informs the broadcasting station 2 of a change in the service information via the transmitting unit 17 and the communications line 14 (step S32).

The updated service information is sent to the broadcasting station 2 via the transmitting unit 17 and the communications line 14 (step S32). The broadcasting station 2 broadcasts the updated service information (step S33). The updated service information is received by the home-use terminal 3 via the receiver unit 6 (shown in FIG. 2), and the updated service information is displayed on the television set 5 in the same manner as described previously (step S34).

When it is determined, in step S29, that the transaction request is not acceptable, the CPU 15 informs the home-use terminal 3 that the transaction request is rejected (step S30).

Figure 5A:
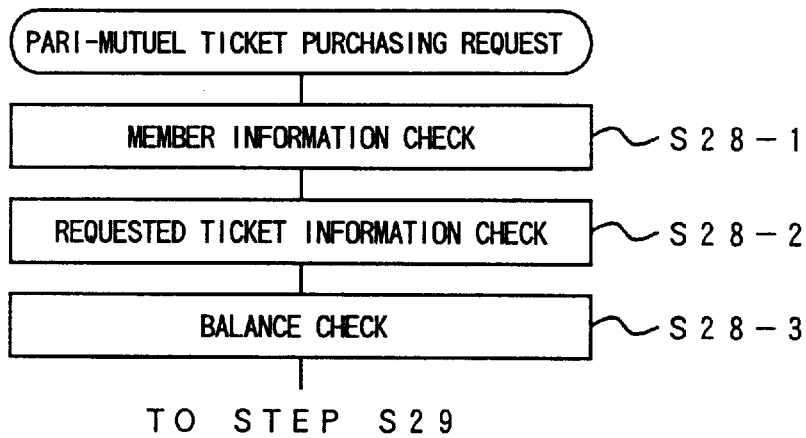
FIGS. 5A and 5B are flowcharts of the operation of the first embodiment of the present invention.

FIG. 5A shows the details of step S28 shown in FIG. 4B in transaction of a pari-mutuel ticket purchasing request. In step S28-1, the data checking unit 18 shown in FIG. 3 checks the member's number, the number of the home-use terminal 3, and information concerning an account (the bank name, branch name, account number, holder name, and so on) contracted between the user and the transaction processing unit 1. Information concerning the above parameters to be checked is transmitted from the home-use terminal 3 in step S27. The member information file 22 shown in FIG. 3 stores corresponding parameter information, and compares the received parameter information with the parameter information stored in the member information file 22. If there is an inconsistency of the parameter information, step S30 shown in FIG. 4B is performed. When no problem is found in step S28-1, step S28-2 is carried out.

In step S28-2, the data checking unit 18 shown in FIG. 3 determines whether or not the requested ticket indicates an acceptable horse race, an available horse number or numbers, or all necessary information. Information concerning the requested ticket is sent from the home-use terminal 3 to the transaction processing center 1 in step S27 shown in FIG. 4A. Information concerning acceptable races is stored in the data memory 21 shown in FIG. 3. When it is determined, in step S28-2, that the transaction request is not acceptable, step S30 is performed. When no problem is found in step S28-2, step S28-3 is performed.

In step S28-3, the data checking unit 18 determines whether or not the balance is enough much to purchase the ticket. When the determination result of step S28-3 is affirmative, step S29 is performed. When not, step S30 is performed.

Figure 5B:
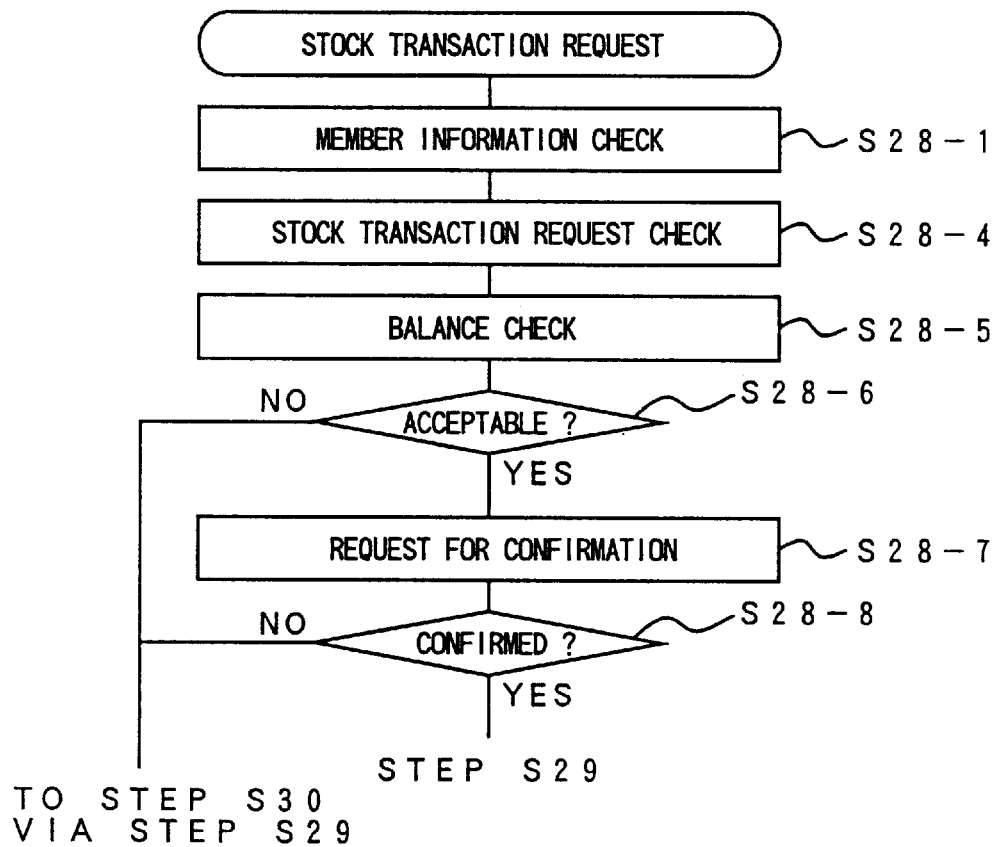

FIG. 5B shows the details of step S28 shown in FIG. 4B in transaction of a stock transaction request. After step S28-1 is performed, the data checking unit 18 shown in FIG. 3 checks the stock transaction request (step S28-4). Information concerning the stock transaction request is sent from the home-use terminal 3 to the transaction processing center 1 in step S27. In step S28-4, it is determined whether or not the number of stocks requested for selling is less than that owned by the user, and it is determined whether or not all information necessary for the stock transaction request has been received. Information concerning the stocks in the stock market is stored in the data memory 21. Then, the data checking unit 18 determines, in step S28-5, whether or not the cost of buying the number of stocks requested is less than the balance. If the result of any of the steps S28-1, S28-4 and S28-5 is negative (step S28-6), step S30 shown in FIG. 4B is carried out.

When it is determined, in step S28-6, the results of all the steps S28-1, S28-4 and S28-5 are affirmative, the data checking unit 18 requests the CPU 15 to send a confirmation signal to the home-use terminal 3 (step S28-7). The confirmation signal includes information concerning the current price of the requested stock and the requested price thereof for buying or selling. The confirmation signal is received by the CPU 8 of the home-use terminal 3 and is processed by the data processing unit 9. Then, image data corresponding to the received confirmation signal is displayed on the television set 5. When the user confirms the content of the confirmation signal on the television set 5, the user inputs an acknowledgement signal to the CPU 8 via the remote control unit 13 by, for example, pressing a corresponding key. The acknowledgement signal is then sent to the CPU 15 of the transaction processing center 1 via the communications line controller 12, the network 4, and the receiving/transmitting unit 16. When the user does not agree to the content of the confirmation signal, the user inputs a reject signal to the CPU 8 via the remote control unit 13 by, for example, pressing a corresponding key. When the acknowledgement signal has been received, the result of step S28-8 is affirmative. When the reject signal has been received, the result of step S28-8 is negative.

A description will now be given of a variation of the first embodiment of the present invention.

Figure 6:
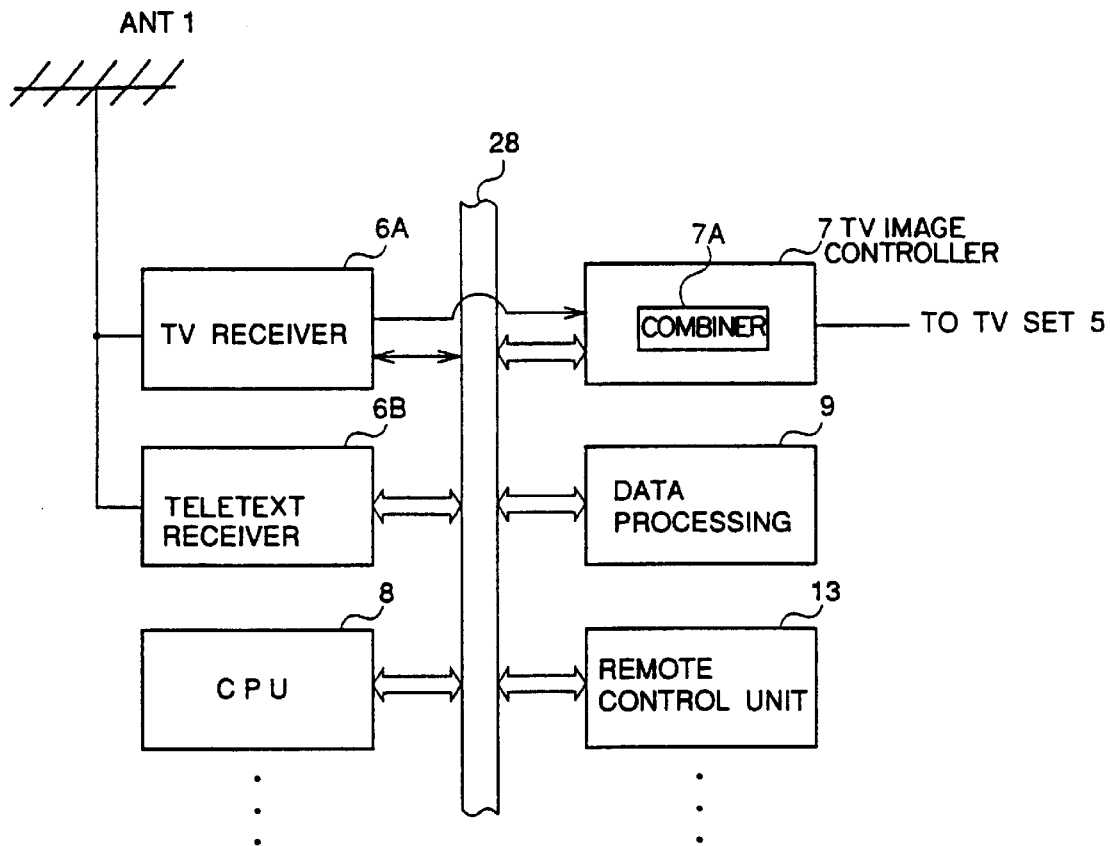
FIG. 6 is a block diagram of a variation of the first embodiment of the present invention.
Figure 7:
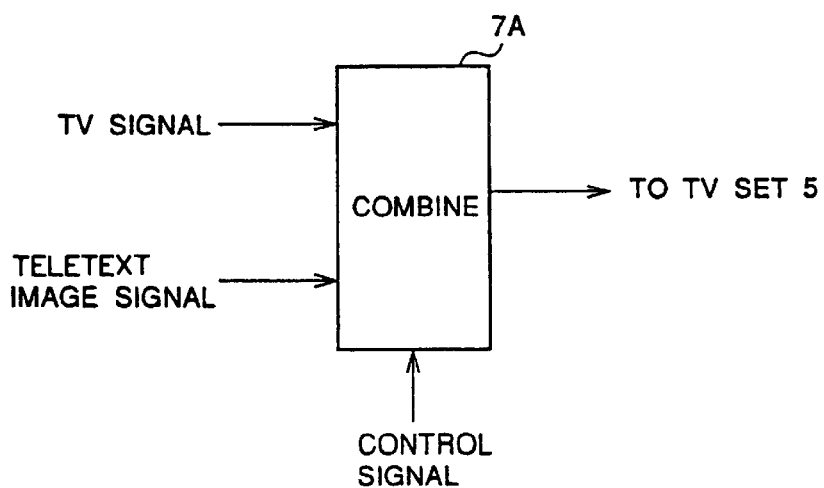
FIG. 7 is a block diagram of a combiner shown in FIG. 6.

FIG. 6 shows the details of the receiver unit 6 shown in FIG. 2 and the television image controller 7 shown therein. It will be noted that the parts 10–12 of the home-use terminal 3 shown in FIG. 2 are omitted from FIG. 6 for the sake of simplicity. The receiver unit 6 is made up of a broadcasted television signal receiver 6A, and a broadcasted teletext signal receiver 6B. The receiver 6A receives the television signal including the video and audio signals via the antenna ANT1. The receiver 6B receives the teletext signal via the antenna ANT1. The received television signal is output to the controller 7, and the received teletext signal is transferred to the data processing unit 9 via a bus 28. As will be described later, the received teletext signal is edited by a full-scale screen editing process or a telop data editing process. The television image controller 7 includes a combiner 7A, which receives the television signal from the receiver unit 6A and the teletext image signal from the data processing unit 9 via the bus 28. In the telop data editing process, the combiner 7A outputs a composite image signal in which the teletext image signal is superimposed on the television signal. The telop data editing process is performed when a superimposing mode is selected. The full-scale screen editing mode is performed when the superimposing mode is not selected. In the full-scale screen editing process, the combiner 7A allows only the teletext image signal to pass through the combiner 7A. In a television mode, the combiner 7A allows only the television signal to pass through the combiner 7A. The operation of the combiner 7A is controlled by a control signal generated by the CPU 8 of the home-use terminal 8.

Figure 8:
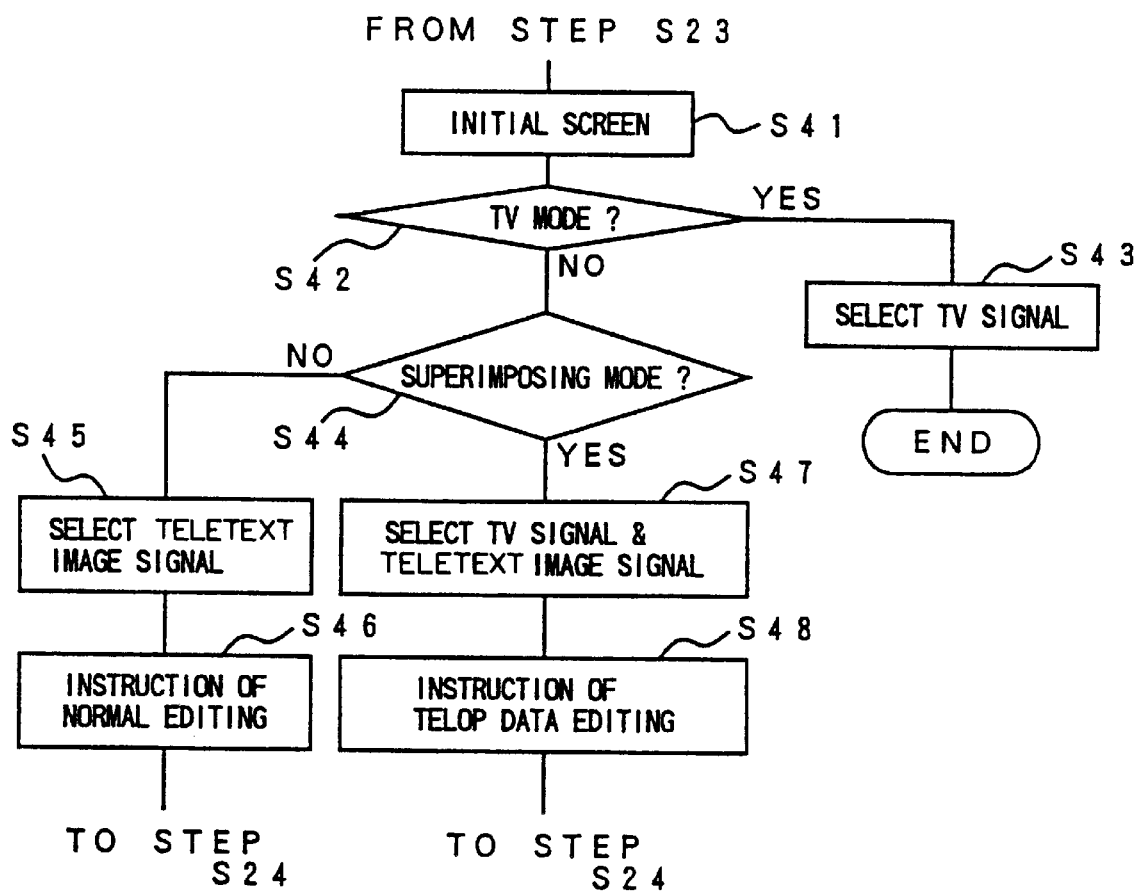
FIG. 8 is a flowchart of the operation of the variation of the first embodiment of the present invention.

FIG. 8 is a flowchart of the operation of the variation of the first embodiment of the present invention. The steps S21, S22 and S23 shown in FIG. 4A are carried out, the CPU 8 performs step S41. The CPU 8 reads data from the software card inserted in the software card unit 11, and creates an initial screen from the read data. The initial screen indicates information for selecting either the television mode or the superimposing mode. In step S42, the CPU 8 determines whether or not the user selects the television mode by means of the remote control unit 13 shown in FIG. 2. When the determination result of step S42 is YES, the CPU 8 outputs the control signal to the combiner 7A, which allows the television signal to pass through the combiner 7A. Hence, the television images are displayed on the television set 5.

Figure 9:
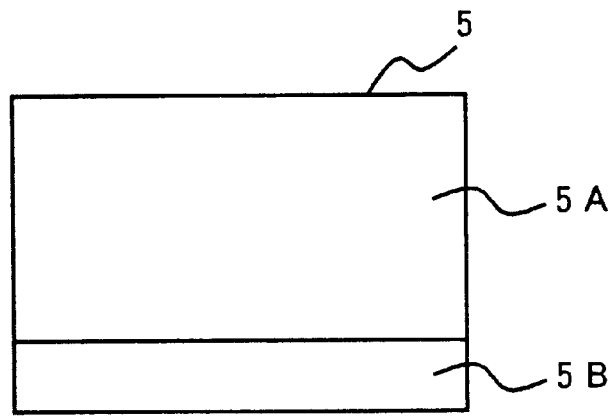
FIG. 9 is a diagram showing how an image of a teletext signal is superimposed on an image of a television signal.

When the non-selection of the television mode is specified, the CPU 8 performs step S44, in which it is determined whether or not the superimposing mode is selected. When it is determined that the superimposing mode is selected, the CPU 8 outputs the control signal to the combiner 7A, which starts to superimpose the teletext image signal on the television signal. Further, the CPU 8 instructs the data processing unit 9 to perform the telop data editing process. The data processing unit 9 generates telop data from the teletext image broadcasted by the broadcasting station 2 in step S25 shown in FIG. 4A after the receiving of teletext signal is started. As shown in FIG. 9, the screen of the television set is divided into a television image area 5A and a teletext image area 5B in the superimposing mode. The data processing unit 9 generates telop data displayed on the teletext image area 5B. The telop data is sent to the combiner 7A as the teletext image signal.

The telop data can be obtained by such an editing process that all or some of the packets stored in the memory 10 are read out and arranged so that an image formed by the read packets is displayed on the teletext image area 5B.

Further, in step S25, the combiner 7A superimposes the teletext image data on the television signal so that the signal component of the television signal to be displayed on the teletext image area 5B is converted into a signal component making the teletext image are 5B transparent and the telop data is displayed on the teletext image area 5B. In this manner, the television image and the telop data image can be simultaneously displayed on the television set 5.

Figure 10:
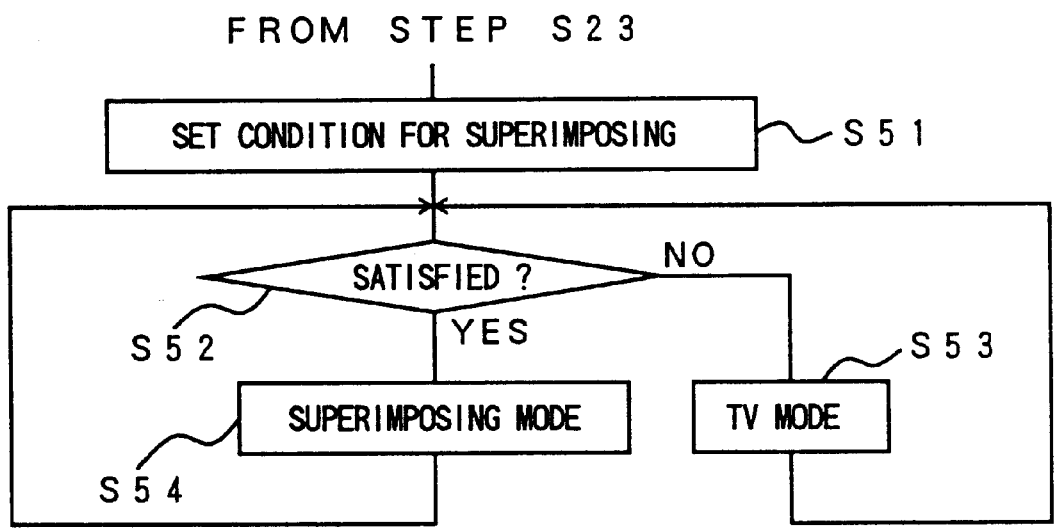
FIG. 10 is a flowchart of another variation of the first embodiment of the present invention.

As shown in FIG. 10, it is possible to automatically select either the television mode or the superimposing mode. After step S23 shown FIG. 4A is carried out, the CPU 8 performs step S51, in which a predetermined condition for activating the superimposing mode is loaded to the CPU 8 from the software card by means of the software card unit 11 shown in FIG. 2. It is also possible to input data indicating the predetermined condition by means of the remote control unit 13. A decision as to whether or not the predetermined condition is satisfied can be made by detecting a change in the television signal. For example, the predetermined condition is determined on the basis of whether the television signal includes a stereo audio signal or a monaural audio signal. When a program uses a stereo audio signal and an advertising program uses a monaural audio signal, the superimposing mode can be switched on the basis of the audio signal. When the audio signal is a monaural signal, the superimposing mode is selected. Alternatively, it is possible to detect a predetermined image signal contained in the television signal in order to select the superimposing mode.

When the CPU 8 determines that the predetermined condition is satisfied in step S52, the CPU 8 selects the superimposing mode. Then, the steps S47 and S48 shown in FIG. 8 are sequentially carried out. When the CPU 8 determines that the predetermined condition is not satisfied in step S52, the CPU 8 selects the television mode. When the determination result of step S54 is YES, it is possible to perform the steps S45 and S46 shown in FIG. 8 instead of the steps S47 and S48.

In step S48, it is possible to edit the received teletext so that still teletext images are displayed on the teletext image area 5B.

It is also possible to decide the predetermined condition based on the teletext signal broadcasted so that the teletext signal is superimposed on the television signal. In step S51 shown in FIG. 10, a screen for inputting a predetermined condition to the home-use terminal 3 is displayed. Such a screen can be obtained by pressing a predetermined key of the remote control unit 13. A program for setting the predetermined condition is loaded to the CPU 8 from the software card.

For example, a condition "the price of stock A in X market becomes less than 700 yen" is input to the CPU 8 by operating the remote control unit 13 in accordance with messages indicated on the screen for inputting the predetermined condition to the home-use terminal 3. In step S52, the CPU 8 compares the received teletext signal concerning stock in X market with the predetermined condition. When it is determined that the predetermined condition is satisfied, the CPU 8 selects the superimposing mode in step S54, and causes a teletext image to be displayed on the television set 5, as shown in FIG. 11A. In FIG. 11A, the teletext image is displayed on the upper area of the whole screen of the television set 5.

It will now be assumed that a condition "each inning ends" of a baseball game is input to the CPU 8. In step S52, the CPU 8 compares the received teletext signal concerning the baseball game with the above predetermined condition. When it is determined that the predetermined condition is satisfied, the CPU 8 selects the superimposing mode in step S54, and causes a teletext image to be displayed on the television set 5, as shown in FIG. 11B.

It will now be assumed that a condition "the congestion on A road is equal to 2 km or less" concerning traffic information is input to the CPU 8. In step S52, the CPU compares the received teletext signal concerning A road with the above predetermined condition. When it is determined that the predetermined condition is satisfied, the CPU 8 selects the superimposing mode in step S54, and causes a teletext image to be displayed on the television set 5, as shown in FIG. 11C.

Thereafter, if the predetermined condition does not become satisfied, the television mode S53 is selected, and television images are displayed on the whole screen of the television set 5. In FIGS. 11A, 11B and 11C, the teletext images can be telop data or still image data.

A description will now be given of a second embodiment of the present invention. A transaction processing system according to the second embodiment of the present invention functions as a ticket issuing system.

Figure 12:
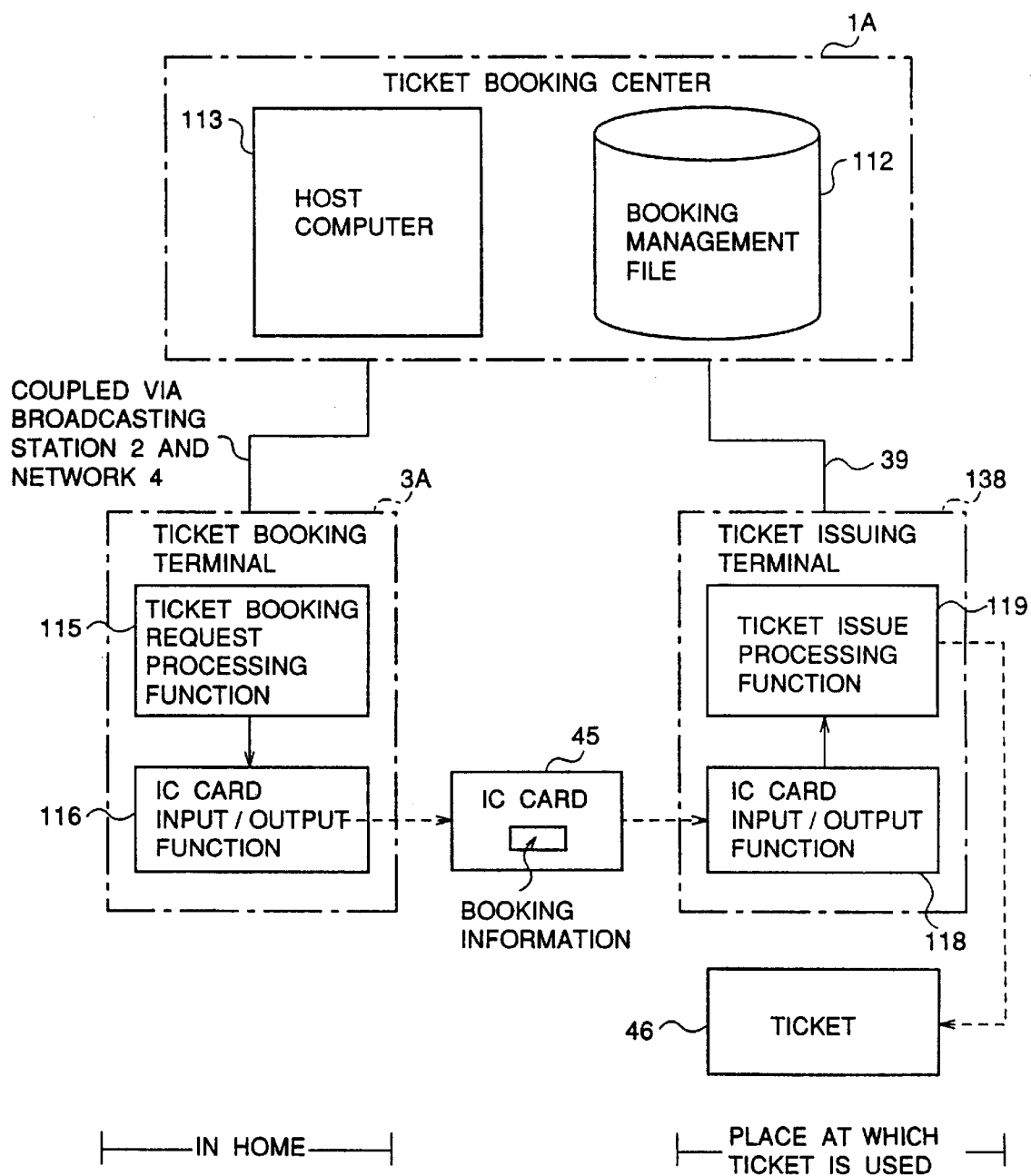
FIG. 12 is a block diagram of a transaction processing system according to a second embodiment of the present invention.

FIG. 12 shows the principle of the transaction processing system according to the second embodiment of the present invention. The system shown in FIG. 12, which function as a ticket booking/issuing system, includes a ticket booking center 1A, a home-use terminal 3A functioning as a ticket booking terminal, and a ticket issuing terminal 38. The ticket booking center 1A and the ticket booking terminal 3A are connected to each other via the broadcasting station 2 and the network 4 shown in FIG.1. The ticket booking center 1A and the ticket issuing terminal are connected to each other via a dedicated communications line 39.

The ticket booking center 1A is made up of a booking management file 112 and a host computer 113, and integrally manages booking of tickets. The booking management file 112 stores information concerning the state of booking of tickets. The host computer 113 processes booking inquiry, booking requests and cancellation from home-use terminals by referring to the booking management file 112. The ticket booking terminal 3A located at home has a ticket booking request processing function 115, and an IC card input/output function 116 is capable of reading and recording data from and on an IC card 45. The ticket issuing terminal 38 located in a ticket using place has an IC card input/output function 118 and a ticket issuing processing function 119. The IC card input/output function 118 is capable of reading and recording data from and on the IC card 45. The ticket issuing processing function 119 issues a ticket on the basis of data read from the IC card 45.

When the user wishes to book a ticket using the system shown in FIG. 12, the user inserts the IC card 45 into the ticket booking terminal 3A. Hence, the ticket booking request processing function 115 is activated. The user sees service information broadcasted by the broadcasting station 2 (FIG. 1), and inquires, via the network 4, whether or not a desired ticket is available. In response to the above inquiry, the host computer 113 accesses the booking management file 112 after a predetermined checking process is completed. When the host computer 113 determines that the requested ticket can be booked, the host computer 113 sends an acknowledgement signal to the ticket booking terminal 3A via the network 4. The ticket booking request processing function 115 records, according to a predetermined protocol, information concerning the booked ticket on the IC card 45 via the IC card input/output function 115.

The user holds the IC card 45 on which the information concerning the booked ticket has been recorded, and requests for issue of the booked ticket when the user actually needs the ticket. The IC card 45 is inserted into the ticket issuing terminal 38, and the information concerning the booked ticket is read therefrom by means of the ticket issuing processing function 119 in accordance with the predetermined protocol. The read information is analyzed by the function 119, and the booked ticket is output by means of a printer (not shown) of the ticket issuing terminal 38. Then, the ticket issuing processing function 119 informs, via the dedicated communications line 39, the ticket booking center 1A that the booked ticket has been issued.

Figure 13:
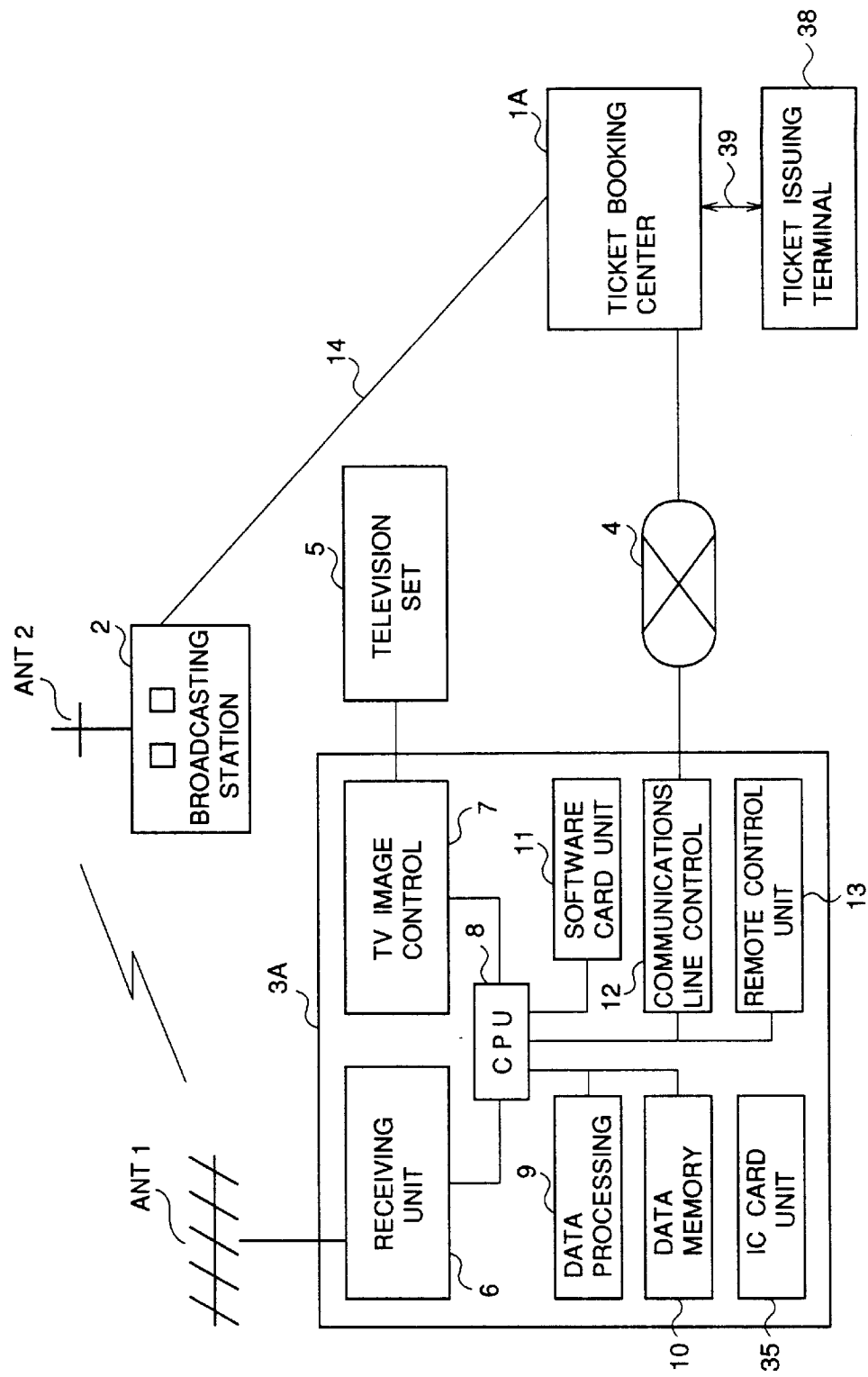
FIG. 13 is a block diagram of a detailed structure of the transaction processing unit shown in FIG. 12.

FIG. 13 shows the detailed structure of the ticket booking/issuing system shown in FIG. 12. In FIG. 13, parts that are the same as parts shown in the previously described figures are given the same reference numbers. The ticket booking terminal 3A is configured by adding an IC card unit 35 having the IC card input/output function 116 shown in FIG. 12 to the home-use terminal 3 shown in FIG. 2.

Figure 14:
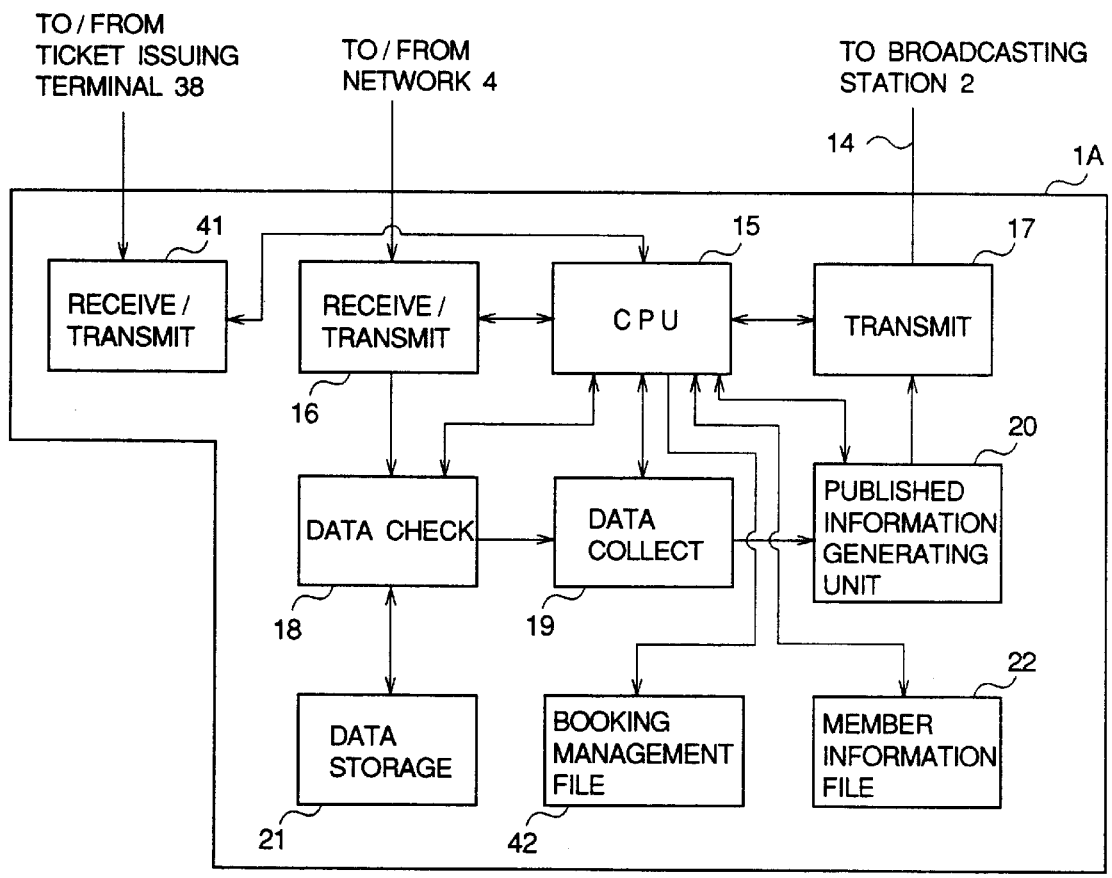
FIG. 14 is a block diagram of a transaction processing center shown in FIG. 13.

FIG. 14 shows the detailed structure of the ticket booking center 1A. In FIG. 14, parts that are the same as parts shown in the previously described figures are given the same reference numbers. The ticket booking center 1A is configured by adding a communications controller 41, and a booking management file 42 to the structure of the transaction processing center 1 shown in FIG. 2. The communications controller 41 controls communications with the ticket issuing terminal 38. In actuality, a plurality of ticket issuing terminals are connected to the communications controller 41 via respective dedicated communications line. The file 42 corresponds to the booking management file 112 sown in FIG. 12.

Figure 15:
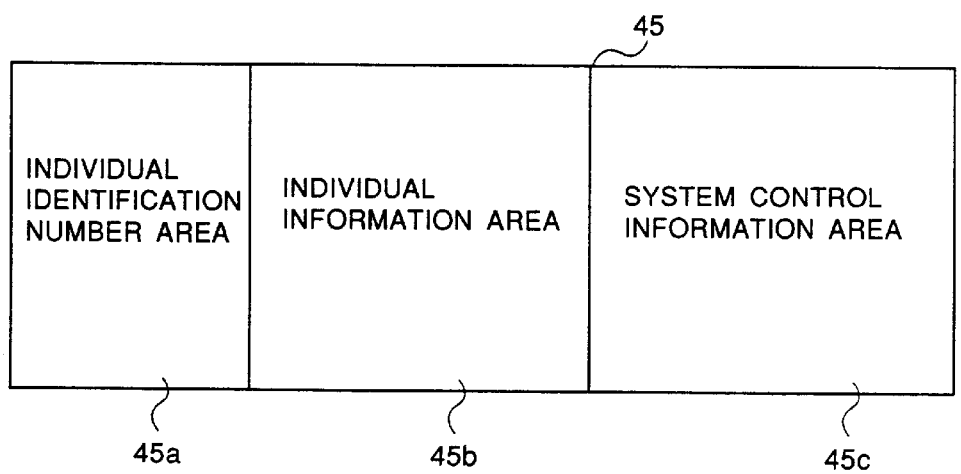
FIG. 15 is a diagram of a format of a software card.

FIG. 15 shows a recording format of the IC card 45, which has an individual identification number area 45a, an individual information area 45b, and a system control information area 45c. The area 45a stores an ID code for identifying the older of the IC card 45. The area 45 stores information concerning the holder of the IC card 45. The area 45c stores programs necessary for the operation of the ticket booking terminal 3A and information necessary for the operation of the ticket booking terminal 3A.

Figure 16A:
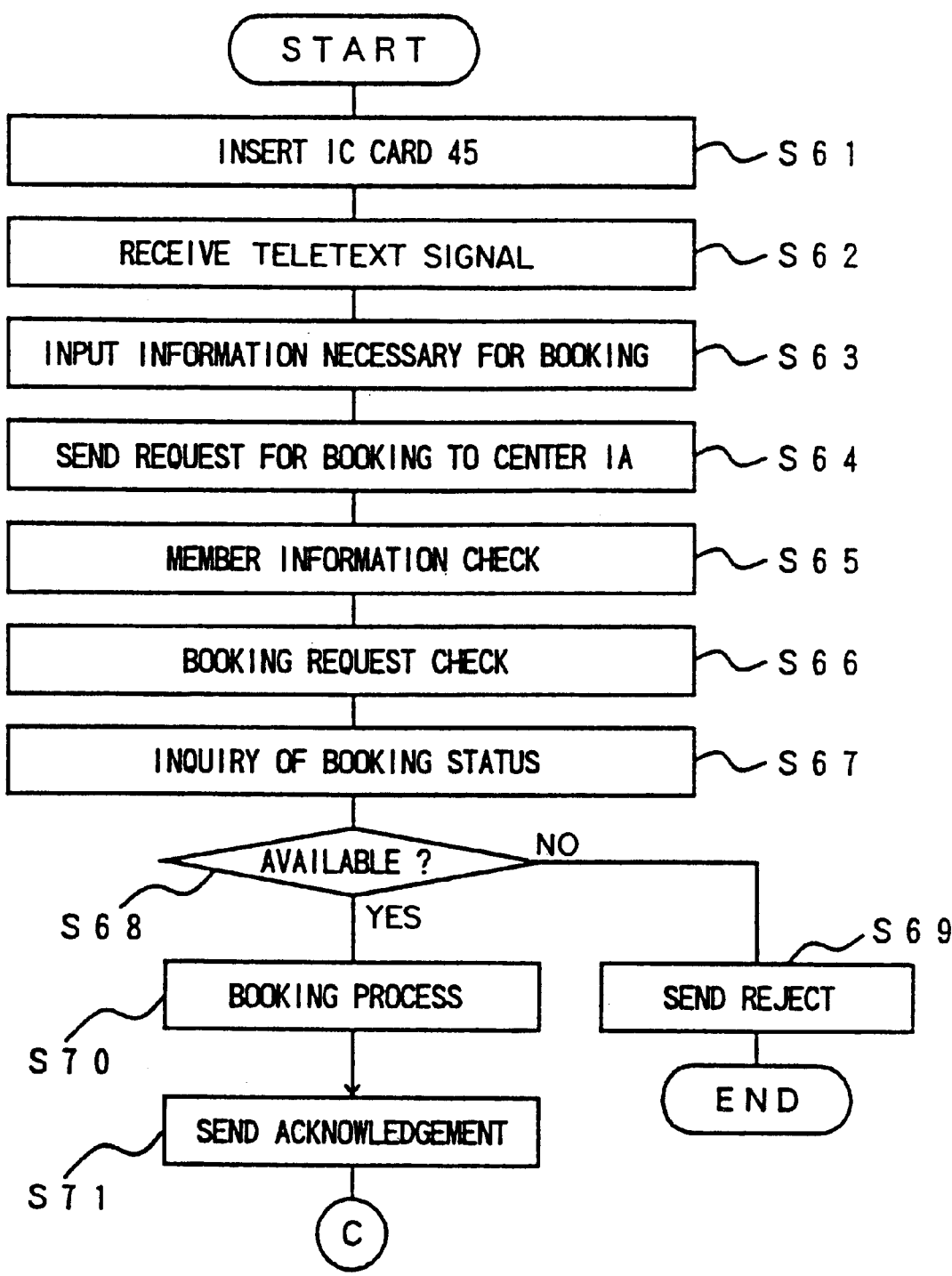
FIGS. 16A, 16B and 16C are flowcharts of the operation of the second embodiment of the present invention.

A description will now be given, with reference to FIGS. 16A and 16B, of the operation of the second embodiment of the present invention. The user inserts his or her IC card 45 into the IC card unit 35 (step S61). The ticket booking terminal 3A receives teletext service information from the broadcasting station 2 shown in FIG. 13, and teletext images of the service information are displayed on the television set 5 in the same manner as has been described previously (step S62). The user sees the teletext signal displayed on the television set 5, and inputs information necessary for booking a desired ticket to the ticket booking terminal 3A by means of the remote control unit 13 (step S63). For example, information indicating available seats is displayed, and information indicating a desired seat in a concert, train or the like is specified by the remote control unit 13. The CPU 8 receives the input information (request for booking) and sends it to the ticket booking center 1A via the communications line controller 12 and the network 4 (step S64).

The CPU 15 of the ticket booking center 1A shown in FIG. 14 receives the information concerning the booking request via the receiver/transmitter unit 16. Then, in step S65, the CPU 15 refers to the file 22 and checks the member's number, the number of the home-use terminal 3A, and information concerning an account (the bank name, branch name, account number, holder name, and so on) contracted between the user of the terminal 3A and the transaction processing unit 1A. In step S66, the CPU 15 refers to the files 22 and 42, and checks whether or not the request for booking has any problem. In step S67, the CPU 15 refers to the files 22 and 42, and checks the booking status concerning the requested item. In step S68, the CPU 15 determines whether or not the requested seat is available. If the determination result of step S68 is negative, the CPU 15 of the ticket booking center 1A sends a reject signal to the ticket booking terminal 3A via the receiver/transmitter unit 16 and the network 4 in step S69. When it is determined that the requested seat is available, in step S70, the CPU 15 performs a booking process in which the requested seat is assigned to the user of the ticket booking terminal 3A. In step S71, the CPU 15 sends an acknowledgement signal to the ticket booking terminal 3 via the receiver/transmitter unit 16 and the network 4. The acknowledgement signal includes booking information specifying a booking identification number and other necessary information.

Figure 16B:
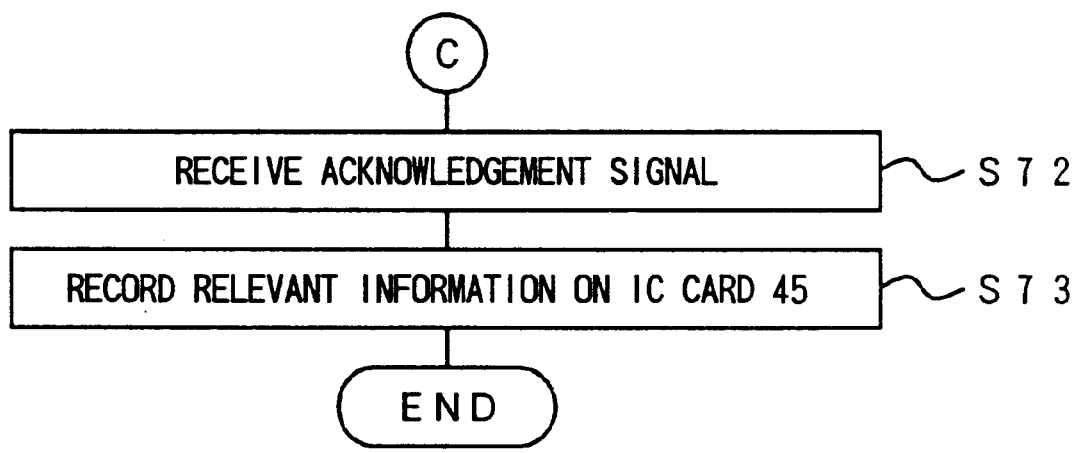

The acknowledgement signal is received by the CPU 8 of the ticket booking terminal 3A shown in FIG. 13 (step S72 shown in FIG. 16B). Then, the CPU 8 records the booking information contained in the acknowledgement signal on the IC card 45 via the IC card unit 35 in accordance with the predetermined protocol (step S73).

Figure 16C:
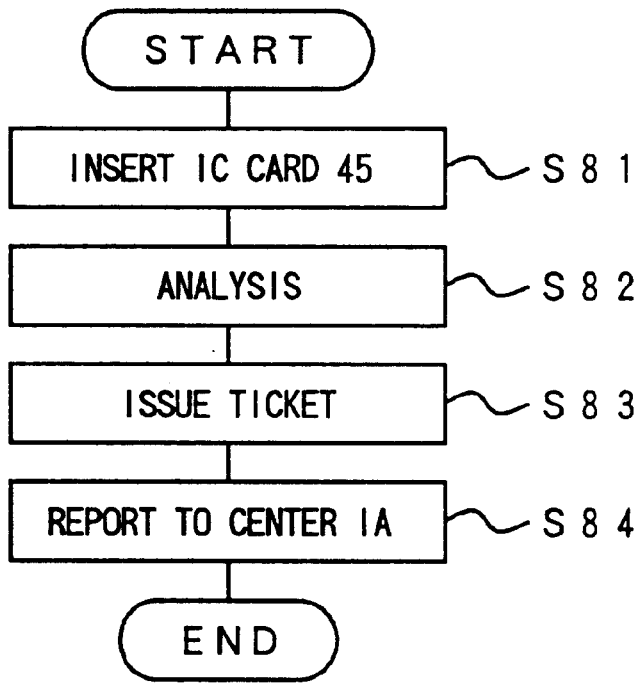

When the user needs the booked ticket, the user goes to the ticket issuing terminal 38 shown in FIG. 13, and inserts the IC card 45 into the ticket issuing terminal 38. The ticket issue processing function 119 reads necessary information from the IC card 45 (step S81 shown in FIG. 16C), and analyzes the read information (step S82). Then, the booked ticket is issued in step S83. Thereafter, the ticket booking center 1A is informed, via the communications line 39, that the booked ticket has been issued.

Figure 17:
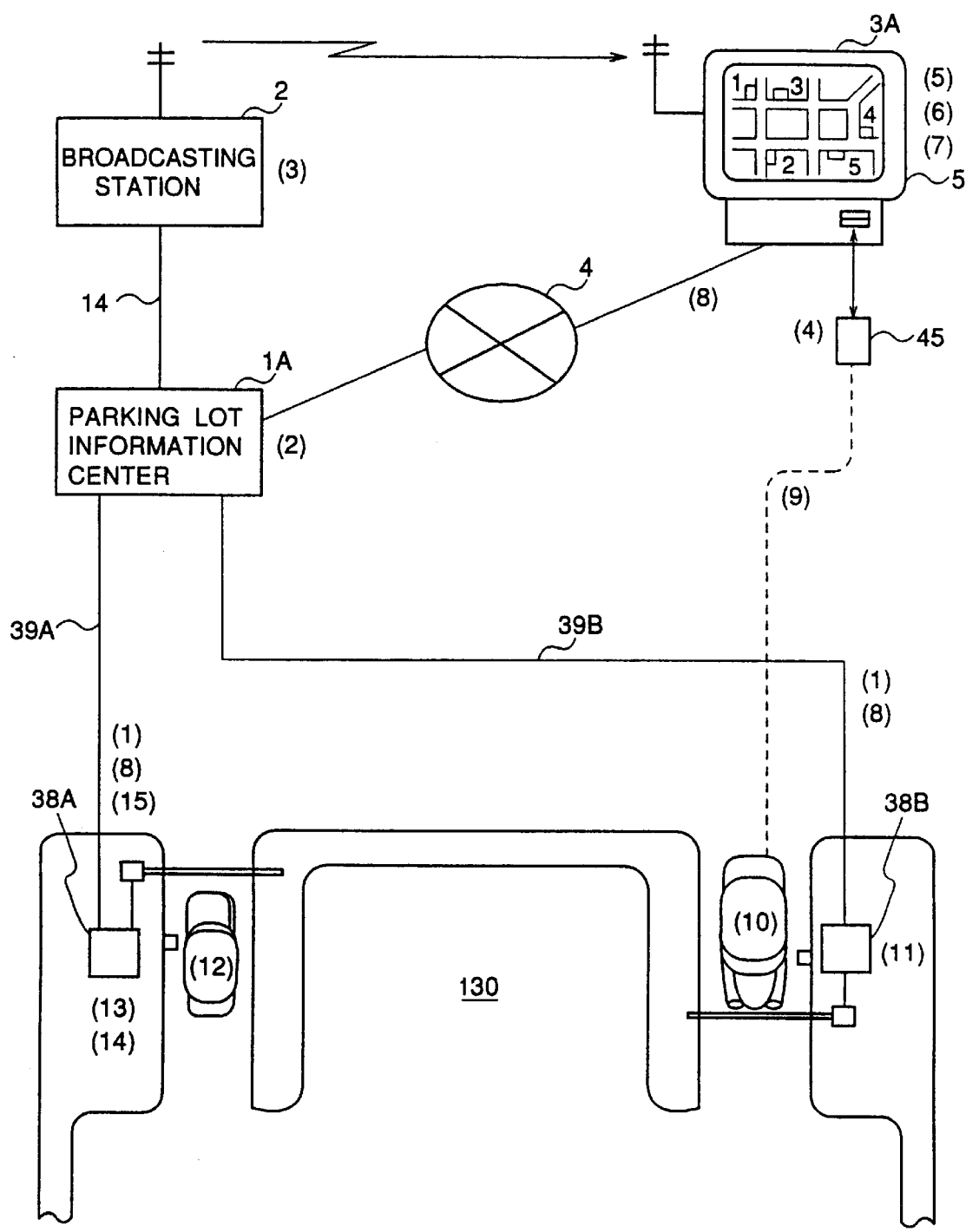
FIG. 17 is a block diagram of an application of the second embodiment of the present invention.

A description will now be given, with reference to FIG. 17, of an application of the second embodiment of the present invention. FIG. 17 shows a parking space booking system based on the second embodiment of the present invention. In FIG. 17, parts that are the same as those shown in the previously described figures are given the same reference numbers. The ticket booking center 1A functions as a parking lot information center that manages information concerning a parking lot 130. A terminal 38A connected to the parking space booking center 1A via a dedicated communications line 39A is located at an entrance gate of the parking lot 130. A terminal 38B connected to the parking space booking center 1A via a dedicated communications line 39B is located at an exit gate of the parking lot 130. Each of the terminal 38A and 38B corresponds to the ticket issuing terminal 38 shown in FIG. 13.

In step (1) shown in FIG. 17, the parking lot terminals 38A and 38B respectively send, via the communications lines 39A and 39B, the parking lot information center 1A information indicating an available number of parking spaces and/or the numbers of cars passing the entrance and exit gates. The file 42 (FIG. 14) of the parking lot information center 1A stores information concerning parking lots including the parking lot 130 shown in FIG. 17. In step (2), the center 1A sends the information stored in the file 42 to the broadcasting station 2. In step (3), the broadcasting station 2 generates teletext service information from the information sent by the center 1A, and broadcasts the generated teletext service information.

In step (4), the user inserts the IC card 45 into the home-use terminal 3A. Then, a parking area booking program, which is stored in and read from the IC card 45, is located to the memory 10 (FIG. 13) and is then activated. In step (5), the CPU 8 establishes a channel between the terminal 3A and the center 1A in response to an instruction input via the remote control unit 13. An initial screen is displayed on the television set 5. In step (6), the user scrolls the screen as necessary, and specifies a desired zone on the initial screen. In step (7), information indicating parking lots in the specified zone is displayed. In step (8), the user inputs booking information indicating the number of a desired parking lot, date and time (time range), and depresses a predetermined key on the remote terminal unit 13. In the following description, it will be assumed that the user specifies the parking lot 130. In step (8), the booking information is sent to the parking lot information center 1A via the network 4. The center 1A determines whether or not the request for booking the specified parking lot, date and time is acceptable. When the request is acceptable, the center 1A returns an acknowledgement signal to the home-use terminal 3A via the network in step (8). If the request is not acceptable, a reject signal is returned to the home-use terminal 3A in step (8). In step (9), a booking acceptance number contained in the acknowledgement signal is recorded on the IC card 45. The center 1A sends booking information indicating the booking acceptance number, the user ID number, the booked date and time to the terminals 38A and 38B.

In step (9), the user holds the IC card 45 or which the booking information has been recorded, and moves the desired parking lot 130. In step (10), the user inserts the IC card 45 into the terminal 38B located at the entrance gate of the parking lot 130. The terminal 38A reads the booking information from the IC card 45, and compares the booking acceptance number contained therein with the booking acceptance number sent from the center 1A. When both the numbers are equal to each other, the entrance gate is ready for opening. In other cases, an alarm is issued. In step (11), the terminal 38B records the entrance time on the IC card 45. When the user pulls the IC card 45 from the terminal 38B, the gate is opened. In step (12), the user inserts the IC card 45 into the terminal 38A located at the exit gate of the parking lot 130. The terminal 38A records the current time on the IC card. In step (13), the terminal 38A calculates the difference time between the starting time and the end time, and then calculates the fee based on the difference. Then, the terminal 38A displays messages showing the following ways for payment: cash, prepaid card, and account charge. In step (14), the user selects the desired payment, which is input to the terminal 38A. Then, the terminal 38A erases the booking acceptance number from the IC card 45. When the user pulls the IC card 45 from the terminal 38A, the exit gate is opened. In step (15), the terminal 38A informs the center 1A of the way for payment. When the account charge is selected, the balance of the corresponding account is updated.

A description will now be given of a third embodiment of the present invention, which is designed to be capable of applying for admission to a transaction system from the home.

Figure 18:
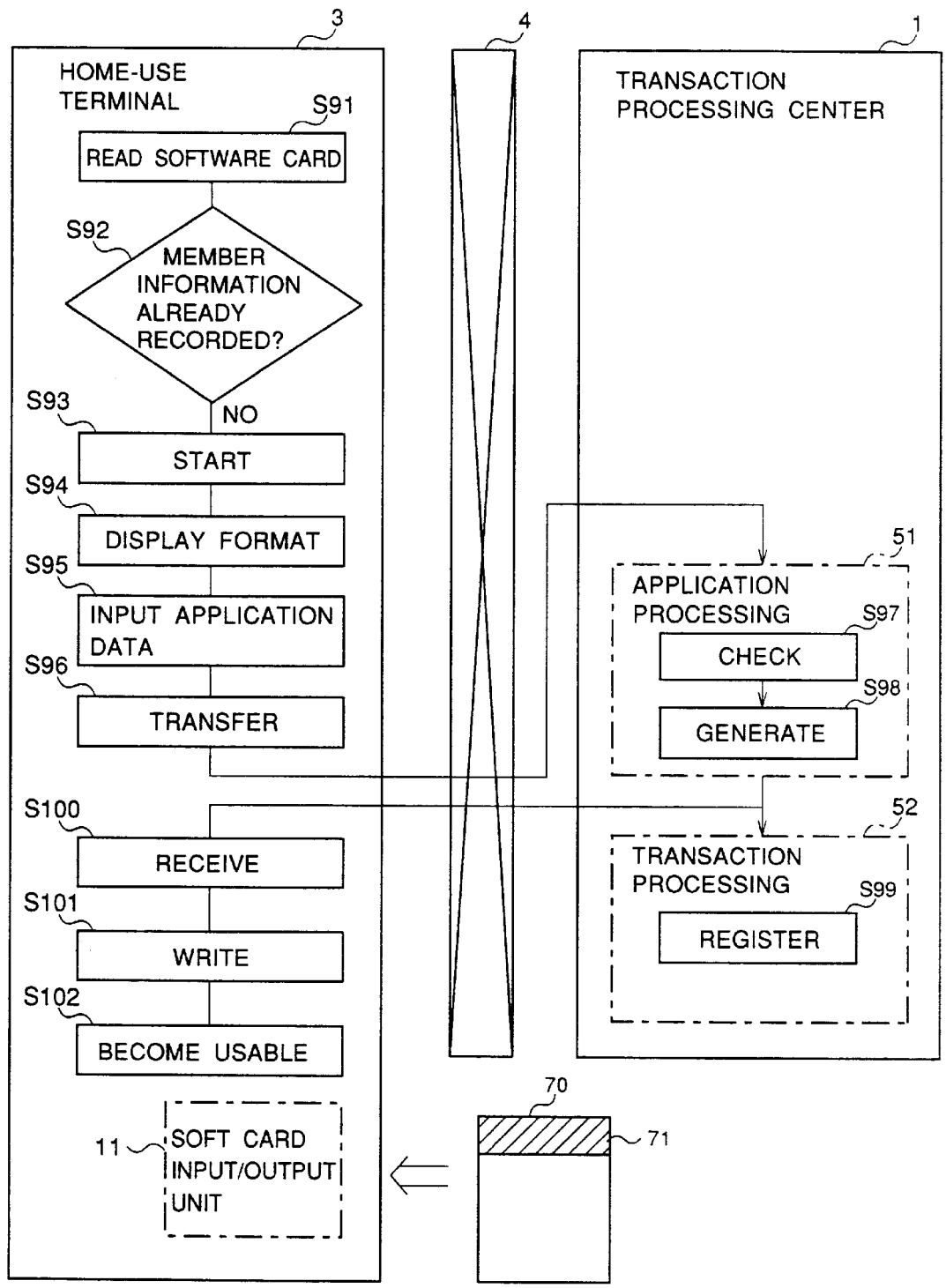
FIG. 18 is a block diagram of the principle of a transaction processing system according to a third embodiment of the present invention.

FIG. 18 shows the principle of the third embodiment of the present invention, which includes the aforementioned transaction processing center 1, the broadcasting station 2 (not shown), the home-use terminal 3 and the network 4. According to the third embodiment, a function composed of steps S91–S96 and S100–S102 is added to the home-use terminal 3 used in the first embodiment of the present invention. Further, an admission procedure processing function 51, and a registration function 52 are added to the transaction processing center 1 used in the first embodiment of the present invention.

Figure 23:
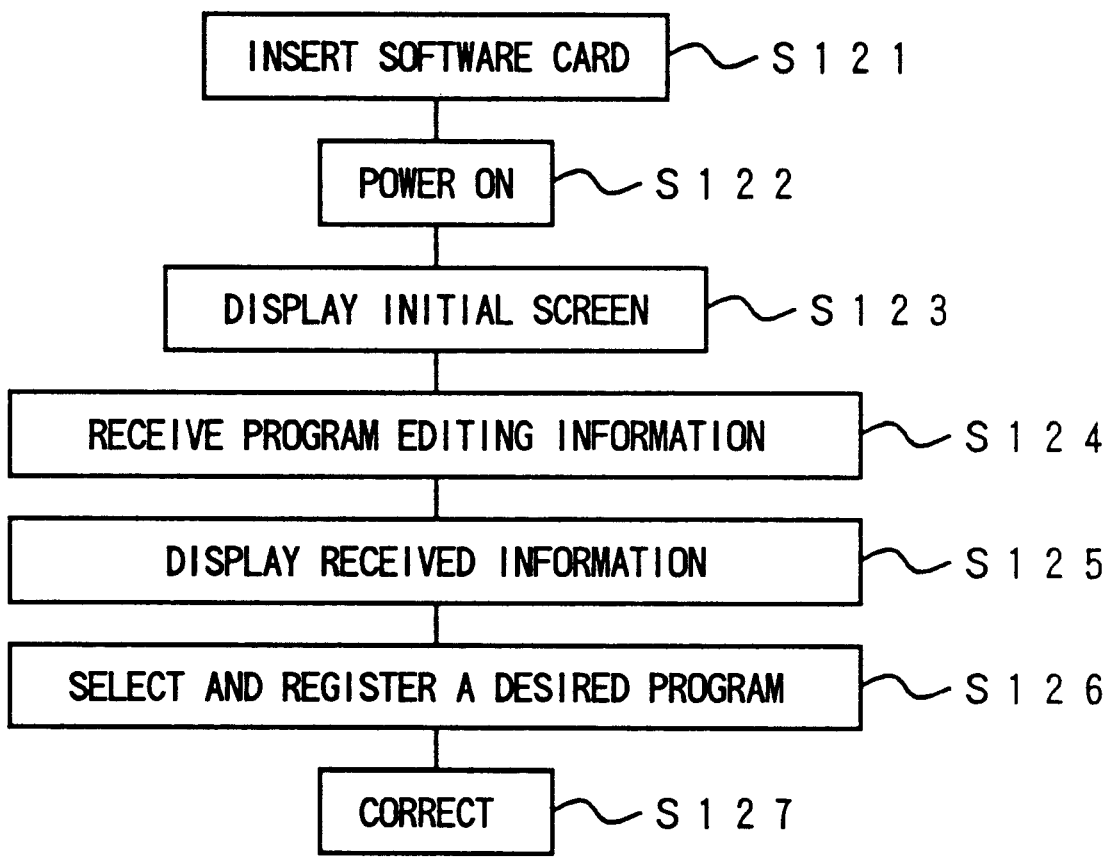
FIG. 23 is a flowchart of the operation of the fourth embodiment of the present invention.

The user purchases a software card 70 having a program for applying for admission to an in-home transaction system 71, and inserts the software card 70 into the aforementioned software card unit 11. The application-for-admission program 71 is read from the software card 71 (step S91), and it is determined whether or not member information has been registered (step S92). When it is determined that the member information has been registered, the aforementioned step S23 shown in FIG. 23 is carried out. When it is determined, in step S92, that the member information has not been registered, the program 71 is started (step S93). Then, an application-for-admission format is displayed on the television set 5 (in step S94). In FIG. 18, the television set 5 is not shown for the sake of simplicity. The user inputs data necessary for applying for admission (step S95). The data input in step S95 is transferred to the transaction processing center 1 via the network 4 (step S96). The function 51 of the transaction processing center 1 checks the transferred data on application for admission (step S97). When it is determined that the application for admission is acceptable, the function 51 creates member information including a member number (step S98). The member information is then transferred to the registration function 52 by which the member information is registered (step S99). Further, the member information is transferred to the home-use terminal 3 via the network 4 and is received (step S100). The received member information is recorded on the software card 70 (step S101), and hence the user becomes a member of the in-home transaction system (step S102).

The system structure of the third embodiment of the present invention is the same as that of the first embodiment of the present invention shown in FIG. 2. A further description will now be given, with reference to FIG. 2 and FIGS. 19A and 19B, of the third embodiment of the present invention.

The user inserts the software card 71 into the software card unit 11 shown in FIG. 2 (step S111), and turns ON power supply (step S112). The application-for-admission program 70 is read from the software card 70 and is stored in the data memory 10. The CPU 8 starts to operate in accordance with the program 70, and determines whether or not the software card 70 is used for the first time (step S113). When the determination result of step S113 is NO, step S120 shown in FIG. 19B is carried out in which the transaction recorded on the software card 70 is usable, and step S23 (shown in FIG. 2) is carried out. When the determination result of step S113 is YES, the application-for-admission format is read from the software card 70 and is displayed on the television set 5 under the control of the CPU 8 (step S114). The user sees input instructions displayed on the television set 5 and inputs necessary data by means of the remote control unit 13 (step S115). When necessary data has been input, a corresponding key of the remote control unit 13 is depressed and the necessary data is transferred to the transaction processing center 1 (step S116) via the network 4.

The CPU 15 shown in FIG. 3 receives the transferred data via the receiver/transmitter unit 16, and determines whether or not the application request is acceptable (step S117). When the application request is acceptable, member information concerning the user using the home-use terminal 3 is registered, and an acknowledgement signal containing the registered member information is returned to the home-use terminal 3 via the network 4 (step S118). If the application request is not acceptable, a reject signal is sent to the home-use terminal (step S118). The acknowledgement signal is received via the communications controller 12, and is applied to the CPU 8. Then, acknowledgement is displayed together with the member information (step S119). Then, step S120 is performed.

Figure 20:
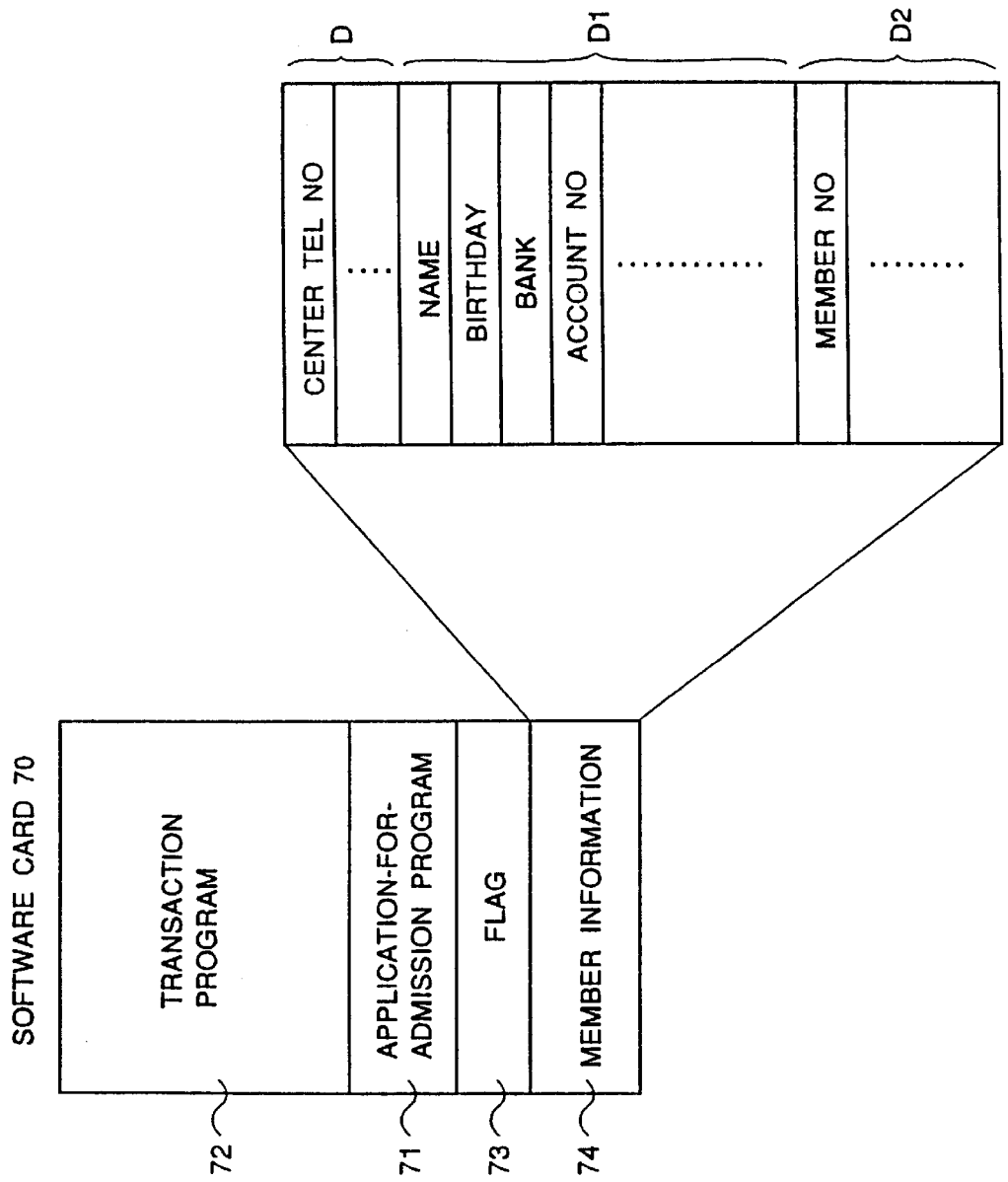
FIG. 20 is a diagram of a format of an IC card.

FIG. 20 shows a format of the software card 70. In addition to the application-for-admission program 71, the software card 70 includes a transaction program 72, a flag 73, and member information 74. The transaction program 72 relates to, for example, stock dealings. The flag 71 is equal to zero when the software card 70 has not been used, and equal to one when the software card 70 has been registered. The member information 74 includes data area D which is recorded on the software card 70 before it is shipped from the factory. Further, the member information 74 has input data D1, which is input by the user during the application-for-admission process. Furthermore, the member information 74 has data D2, which is recorded when the acknowledgement signal is received from the transaction processing center 1.

More particularly, the data D includes the telephone number of the transaction processing center 1. The data D1 includes the name of the software card holder, the birthday thereof, the bank name thereof, and the account number thereof, The data D2 includes the member number.

Figure 19A:
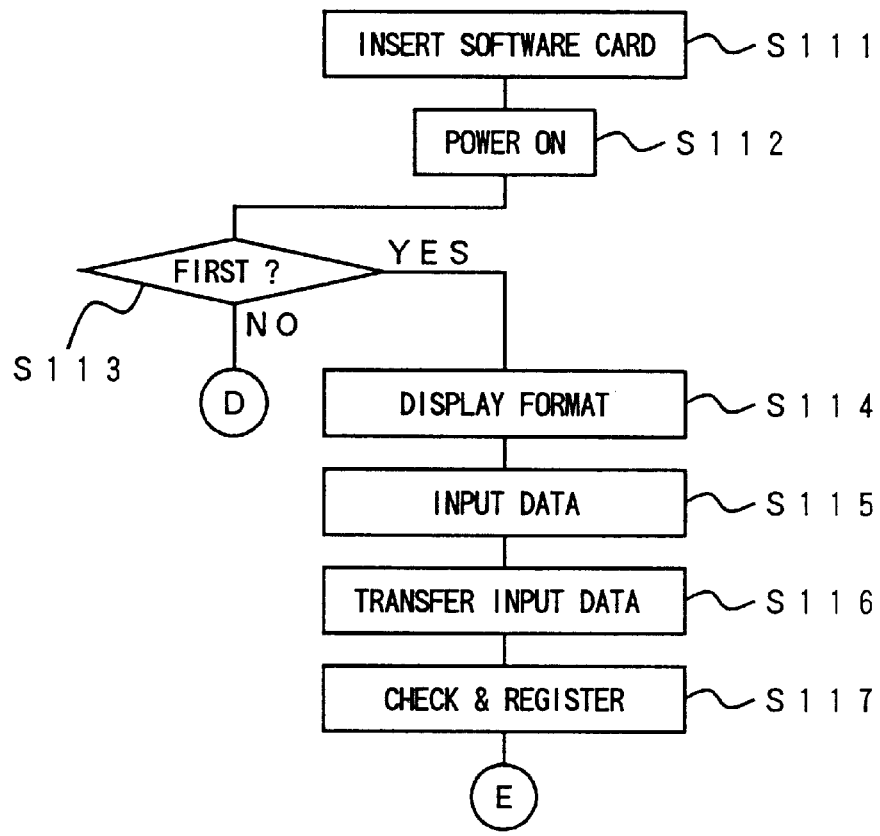
FIGS. 19A and 19B are flowcharts of the third embodiment of the present invention.
Figure 19B:
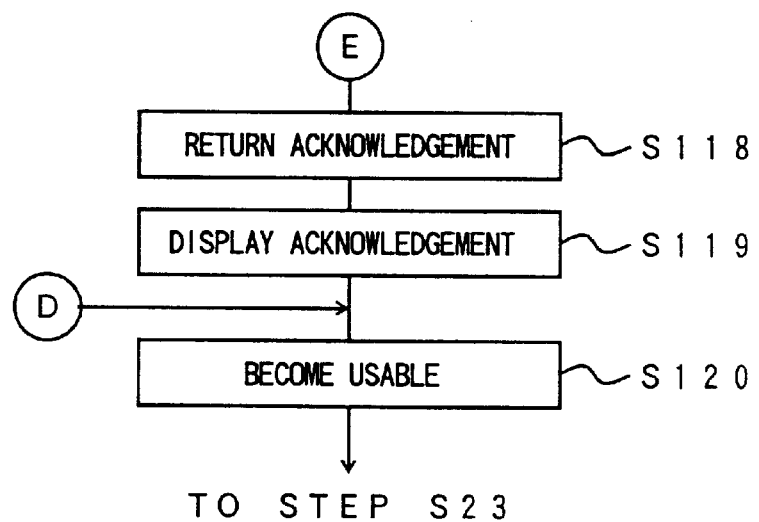

In step S113 shown in FIG. 19A, the flag 73 is referred to. When the flag is equal to zero, step S114 is carried out, and the application-for-admission program 71 is read from the software card 70. Data input in step S115 is recorded on the software card 70 as input data D1. In step S116, the input data D1 is transferred to the transaction processing center 1 via the network 4. In step S119, the data D2 transferred from the transaction processing center 1 is recorded on the software card 70.

A description will now be given of a fourth embodiment of the present invention. The fourth embodiment of the present invention includes an automatic reserved program changing function.

Figure 21:
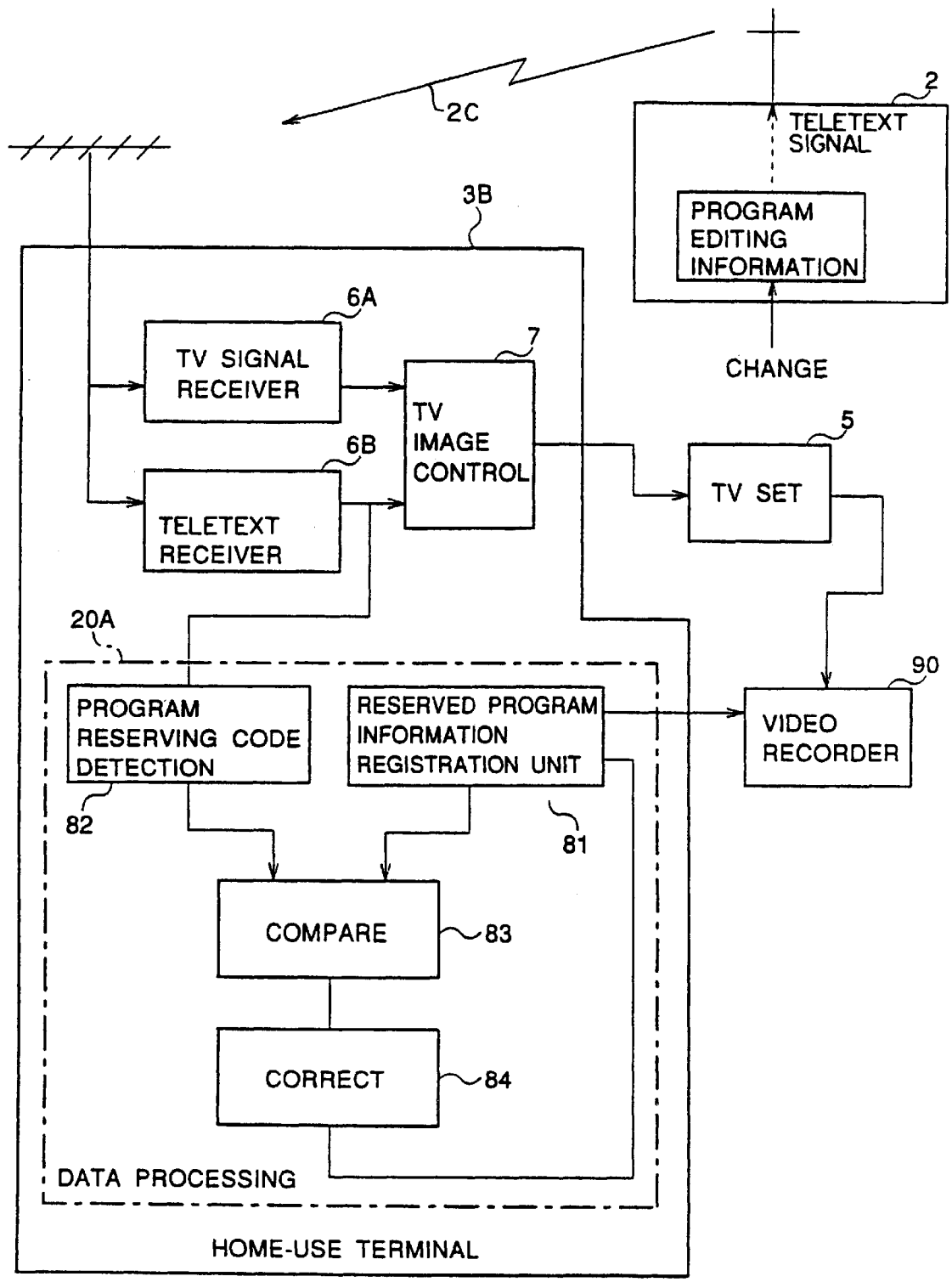
FIG. 21 is a block diagram of the principle of a transaction processing system according to a fourth embodiment of the present invention.

FIG. 21 shows the principle of the fourth embodiment of the present invention. In FIG. 21, parts that are the same as those shown in the previously described figures are given the same reference numbers. A transaction processing system shown in FIG. 21 comprises the broadcasting station 2, and a home-use terminal 3B to which the television set 5 and a video recorder 90 are connected. Though the system shown in FIG. 21 includes the transaction processing center 1, it is not shown in FIG. 21 for the sake of simplicity.

The home-use terminal 3B includes a data processing unit 20A made up of a TV program reserving information registration unit 81, a program reserving code detection unit 82, a program reserving information comparing unit 83, and a program reserving information correction unit 84. The program reserving information registration unit 81 registers information concerning reserved programs in the form of a table. On the basis of the program reserving information, information indicating a program to be reserved on the video recorder 4 is applied to the video recorder 90. The program reserving information is managed using a program number, and includes a channel number, a recording starting time and ending time. The program reserving information is handled in the form of a program reserving code. The program reserving code detection unit 82 detects a program reserving code contained in the teletext signal broadcasted by the broadcasting station 2 according to program editing information 2C. The program reserving information comparing unit 83 compares the program reserving code detected by the unit 82 with the registered program reserving code supplied from the unit 81. The program reserving information correction unit 84 corrects the program reserving information registered in the unit 81 when a mismatch is detected by the unit 83.

When the user wishes to reserve a program, the user activates the program reserving information registration unit 81, and registers a corresponding program reserving code. The broadcasting station 2 broadcasts the program editing information 2C in the form of teletext via a normal or dedicated channel. When the dedicated channel is not used to broadcast the program editing information 2C, information making it possible to be easily extracted from another broadcasted teletext signal is added to the information 2C. Alternatively, the information 2C is broadcasted in a predetermined time. Information indicating the above predetermined time is programmed, and the program reserving code detection unit 82 is automatically activated. When the dedicated channel is used, the program reserving code detection unit 82 is always active.

Figure 22:
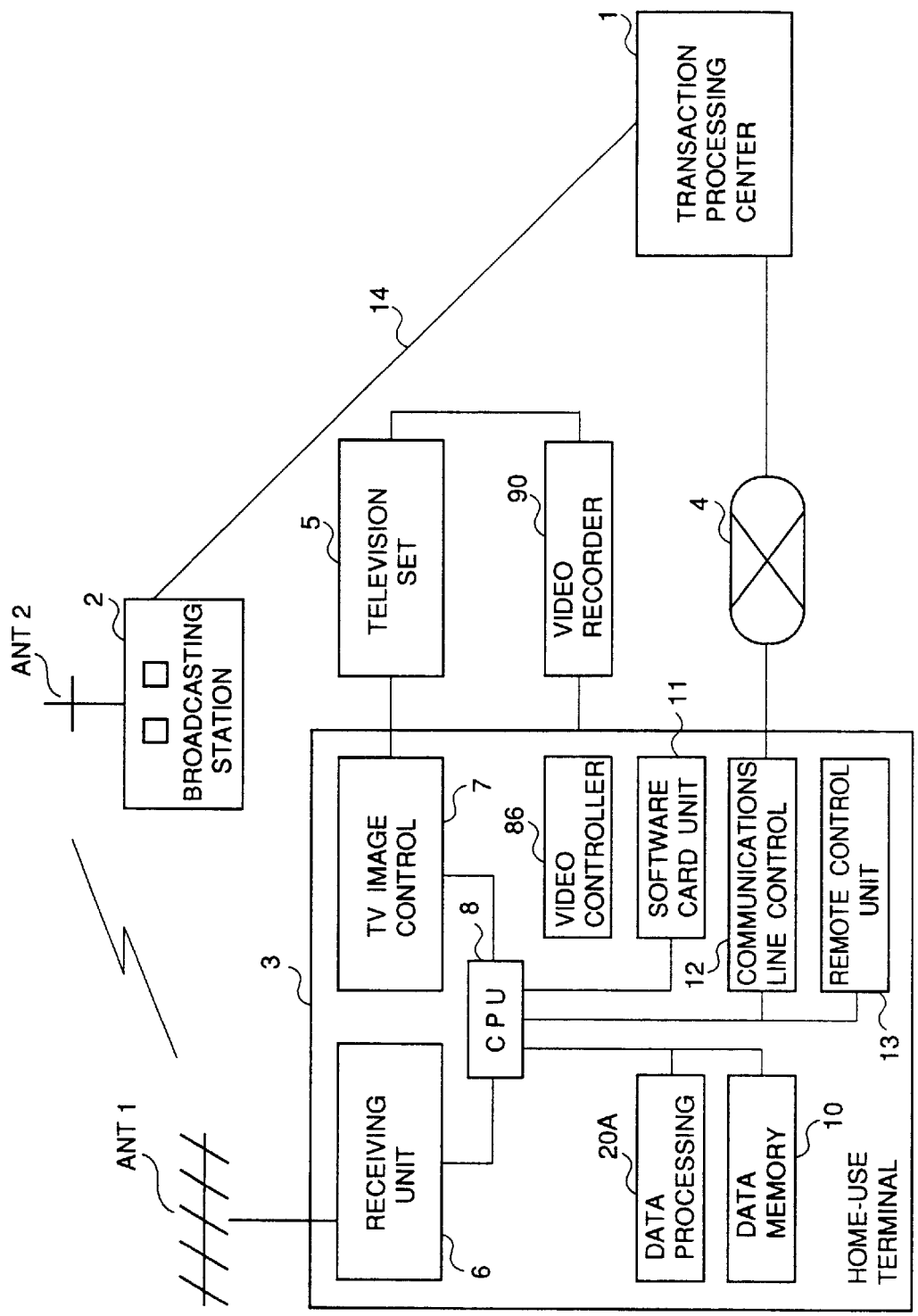
FIG. 22 is a block of a detailed structure of the transaction processing system according to the fourth embodiment of the present invention.

FIG. 22 shows the detailed structure of the fourth embodiment of the present invention. In FIG. 22, parts that are the same as those shown in the previously described figures are given the same reference numbers. A video controller 86 controls the video recorder 90.

FIG. 23 is a flowchart of the operation of the fourth embodiment of the present invention. The user inserts the software card 70 into the software card unit 11 (step S121), and turns ON the power supply (step S122). A program for realizing the function of the processing unit 20A is read from the software card. Then, an initial screen is displayed under the control of the CPU 8 (step S123). Character information corresponding to the program editing information 2C broadcasted by the broadcasting station 2 is received (step S124). The teletext is displayed on the television set 5 (step S125). The user sees the screen, and registers a program to be reserved by using the remote control unit 13 (step S126).

When a change in a program occurs, the program editing information 2C is updated so that information concerning the program change is included therein. For example, if the starting time of a program is delayed by 30 minutes, the program editing information 2C is updated. The teletext signal corresponding to the program editing information 2C is received by the broadcasted teletext receiver unit 6B, and is applied to the program reserving code detection unit 82. The detected program reserving code is compared with the registered program reserving code supplied from the program reserving information registration unit 81. It will now be assumed that the program names indicated by the codes to be compared coincide with each other, but the starting times are different from each other. More specifically, the starting time of the reserved program is delayed by 30 minutes, the correction unit 84 changes the registered information so that the staring and end times are respectively delayed by 30 minutes. At the starting time of the reserved program, the registration unit 81 activates the video recorder 90 (step S127).

It is possible for the CPU 8 instead of the data processing unit 20A to perform step S127.

The present invention is not limited to the specifically disclosed embodiments, and variations and modifications may be made without departing from the scope of the present invention.

What is claimed is:

1. A transaction processing system responsive to a broadcasting station broadcasting a television signal and a related teletext signal, the teletext signal including information relating to a plurality of transactions, the transaction processing system comprising:

a home-use terminal receiving the television signal and the related teletext signal;

a television set connected to said home-use terminal;

a transaction processing center comprising a checking unit determining whether a transaction request received by said transaction processing center is acceptable and, if acceptable, said transaction processing center performing the transaction and updating the information of the teletext signal based on the performed transaction, whereby the broadcast station thereafter broadcasts the updated teletext signal including the updated information; and a communications network connecting said home-use terminals to said transaction processing center; and each of said home-use terminal comprises:

a first unit receiving the broadcasted television signal and related teletext signal and editing the teletext signal into a predetermined format, the edited and displayed teletext signal providing a list of transaction items respectively representing the plurality of transactions, each transaction item being selectable by a corresponding input to said home-use terminal by a user thereof, and displaying an image of the television signal and an image of the edited teletext signal on the television set, a second unit generating a request for a desired transaction responsive to an input received from the user, the received input indicating selection of a displayed transaction item representing the desired transaction and the generated request including information corresponding to the desired transaction, and a third unit sending the request to said transaction processing center via said communications network, the request for the desired transaction being sent to the transaction processing center by the third unit via the communications network.

2. The transaction processing system as claimed in claim 1, wherein a plurality of programs respectively correspond to the plurality of transactions and a plurality of cards each stores a respective program of the plurality of programs, the home-use terminal comprising a fourth unit reading the program stored on a respective card when the second unit generates the request for the desired transaction.

3. The transaction processing system as claimed in claim 1, wherein the first unit further comprises a superimposing unit superimposing the image of the teletext signal on the image of the television signal.

4. The transaction processing system as claimed in claim 1, wherein the first unit further comprises a display unit selectively displaying one of the image of the television signal and the image of the teletext signal on the television set.

5. The transaction processing system as claimed in claim 1, wherein the teletext signal is superimposed on the television signal, as broadcasted.

6. The transaction processing system as claimed in claim 1, wherein one of the plurality of transactions relates to stock dealings.

7. The transaction processing system as claimed in claim 1, wherein one of the plurality of transactions relates to horse racing.

8. The transaction processing system as claimed in claim 1, further comprising plural home-use terminals.

9. The transaction processing system as claimed in claim 1, wherein, in each of the home use terminals:

the second unit receives a selection input from the user designating a predetermined condition which must be satisfied for display of teletext data of a transaction item selected by the user; and the home use terminal further comprises a controller which compares the teletext data of the selected transaction item with the predetermined condition for determining whether to display the teletext data for viewing by the user.

10. The transaction processing as claimed in claim 1, wherein each of the home use terminals further comprises:

a unit receiving a selection input from the user designating a predetermined condition which must be satisfied for display of teletext data of a transaction item selected by the user; and a controller comparing the teletext data of the selected transaction item with the predetermined condition for determining whether to display the teletext data.

11. A transaction processing system operating in coordination with a broadcasting station broadcasting a television signal and a related teletext signal, the teletext signal including ticket booking information, said transaction processing system comprising:

a home-use terminal receiving the broadcasted television signal and related teletext signal and performing ticket booking services based on the teletext signal;

a television set connected to said home-use terminal;

a transaction processing center receiving ticket booking requests, selectively performing ticket issuing services therefor, and updating the ticket booking information based on a received ticket booking request when the received request is determined to be acceptable, whereby an updated teletext signal including the updated ticket booking information is thereafter broadcast by the broadcasting station; and a communications network connecting said home-use terminal to said transaction processing center;

wherein said home-use terminals comprises:

a first unit receiving the broadcasted television and related teletext signals from the broadcasting station, editing the received teletext signal into a predetermined format providing a list of ticket items representing the ticket booking information, each ticket item being selectable by a corresponding input to said home-use terminal by a user thereof, and displaying an image of the television signal and an image of the edited teletext signal on the television set, a second unit generating a request for booking a desired ticket responsive to an input received from the user, the received input indicating selection of a displayed ticket item representing the desired ticket and the request for booking including information corresponding to the desired ticket, and a third unit sending the request for booking to said transaction processing center via said communications network; and wherein said transaction processing center comprises;

a checking unit determining whether the request for booking is acceptable, and an acknowledgment unit sending an acknowledgment signal to said home-use terminal when the checking unit determines the request for booking is acceptable.

12. The transaction processing system as claimed in claim 11, wherein information is recorded on a card, the home-use terminal comprising a fourth unit recording information on the card and reading information from the card, an acknowledgement signal received from the transaction processing center being recorded on the card and including information relating to a booked ticket.

13. The transaction processing system as claimed in claim 11, further comprising a ticket issuing terminal connected to the transaction processing center, wherein the ticket issuing terminal comprises a reading unit reading the acknowledgement signal from the card and issuing a ticket corresponding to the information relating to the booked ticket.

14. The transaction processing system as claimed in claim 11, wherein the transaction processing center comprises an instructing unit instructing the broadcasting station to update the teletext signal when the request for booking the desired ticket is accepted.

15. The transaction processing system as claimed in claim 11, wherein the card is an IC card.

16. The transaction processing system as claimed in claim 11, further comprising plural home-use terminals.

17. The transaction processing system as claimed in claim 11, wherein, in each of the home use terminals:

the second unit receives a selection input from the user designating a predetermined condition which must be satisfied for display of teletext data of a transaction item selected by the user; and the home use terminal further comprises a controller which compares the teletext data of the selected transaction item with the predetermined condition for determining whether to display the teletext data for viewing by the user.

18. A transaction processing system responsive to a broadcasting station broadcasting a television signal and a related teletext signal, the teletext signal including information relating to a plurality of transactions, a card storing an application-for-admission program for becoming a member of the transaction processing system, the transaction processing system comprising:

a plurality of home-use terminals, the teletext signal including information necessary for a transaction common to the plurality of home-use terminals;

television sets respectively connected to the home-use terminals;

a transaction processing center; and a communications network connecting each of the home-use terminals and the transaction processing center;

wherein each of the home-use terminal comprises:

a first unit receiving the broadcasted television and related teletext signals from the broadcasting station, editing the received teletext signal into a predetermined format, the edited and displayed teletext signal providing a list of transaction items respectively representing the plurality of transactions, each transaction item being selectable by a corresponding input to said home-use terminal by a user thereof, and displaying an image of the television signal and an image of the edited teletext signal on the television set, a second unit for generating a request for a desired transaction of the plurality of transactions related to the information of the teletext signal broadcasted by the broadcasting station, the request including information related to the desired transaction, a third unit communicating with the transaction processing center via the communications network, the request for the desired transaction being sent to the transaction processing center by the third unit via the communications network, and a fourth unit reading the application-for-admission program stored on the card and sending the transaction processing center information necessary for applying for admission to become a member of the transaction processing system in accordance with the application-for-admission program.

19. The transaction processing system as claimed in claim 18, wherein, in each of the home use terminals:
the second unit receives a selection input from the user designating a predetermined condition which must be satisfied for display of teletext data of a transaction item selected by the user; and
the home use terminal further comprises a controller which compares the teletext data of the selected transaction item with the predetermined condition for determining whether to display the teletext data for viewing by the user.

20. A plurality of home-use terminals used in a transaction processing system, the transaction processing system responsive to a broadcasting station broadcasting a television signal and a related teletext signal, the teletext signal including information relating to a plurality of transactions and information necessary for a transaction common to the plurality of home-use terminals, the transaction processing system including a television set connected to each of the home-use terminals, a transaction processing center, and a communications network connecting the home-use terminals and the transaction processing center, one of the home-use terminals generating a request for a desired transaction and the transaction processing center checking the request for the desired transaction to determine whether or not the request for the desired transaction is acceptable, the transaction processing center updating the information, as broadcast prior to receipt of the request from one of the plurality of home-use terminals and common to the plurality of home-use terminals, each of the home-use terminals comprising:
a first unit receiving the broadcasted television signal and the related teletext signal, which includes information necessary for a transaction common to the plurality of home-use terminals, editing the received teletext signal into a predetermined format enabling selection of a desired transaction by a home-user, and displaying an image of the television signal and an image of the edited teletext signal on the television set;
a second unit generating a request for, and thereby selecting, a desired transaction of the plurality of transactions related to the information of the teletext signal broadcasted by the broadcasting station, the request including information related to the desired transaction; and
a third unit communicating with the transaction processing center via the communications network, the request for the desired transaction being sent to the transaction processing center by the third unit via the communications network and, when the request for the desired transaction is acceptable, the transaction processing center performing the requested selection and updating the information included in the broadcasted teletext signal in accordance with the performed, requested transaction and forming an updated teletext signal that is broadcast by the transaction processing center, the updated teletext signal including new information, with the updated teletext signal being received by each of the home-use terminals.

21. The transaction processing system as claimed in claim 20, wherein, in each of the home use terminals:
the second unit receives a selection input from the user designating a predetermined condition which must be satisfied for display of teletext data of a transaction item selected by the user; and
the home use terminal further comprises a controller which compares the teletext data of the selected transaction item with the predetermined condition for determining whether to display the teletext data for viewing by the user.

22. A plurality of home-use terminals in a transaction processing system performing ticket booking services and having a broadcasting station broadcasting a television signal and a related teletext signal, the teletext signal including ticket booking information, a transaction processing center performing ticket issuing services and a communications network connecting said home-use terminals to the transaction processing center, each of said home-use terminals comprising:
a first unit receiving the broadcasted television signal and related teletext signal, editing the received teletext signal into a predetermined format providing a list of ticket items representing the ticket booking information, each ticket item being selectable by a corresponding input to said home-use terminal by a user thereof, and displaying an image of the television signal and an image of the edited teletext signal on the television set;
a second unit generating a request for booking a desired ticket responsive to an input received from the user, the received input indicating selection of a displayed ticket item representing the desired ticket and the request for booking including information corresponding to the desired ticket; and
a third unit sending the request for booking to the transaction processing center via the communications network, the request for booking prompting the transaction processing center to update the ticket booking information based thereon when the request for booking is received and determined to be acceptable, whereby the broadcast station thereafter broadcasts an updated teletext signal including the updated ticket booking information.

23. The transaction processing system as claimed in claim 22, wherein, in each of the home use terminals:
the second unit receives a selection input from the user designating a predetermined condition which must be satisfied for display of teletext data of a transaction item selected by the user; and
the home use terminal further comprises a controller which compares the teletext data of the selected transaction item with the predetermined condition for determining whether to display the teletext data for viewing by the user.

24. A plurality of home-use terminals used in a transaction processing system, the transaction processing system responsive to a broadcasting station broadcasting a television signal and a related teletext signal, the teletext signal including information relating to a plurality of transactions and including information necessary for a transaction common to the plurality of home-use terminals, the transaction processing system including a television set connected to each of the home-use terminals, a transaction processing center, and a communications network connecting the home-use terminals and the transaction processing center, a card storing an application-for-admission program for applying for admission to become a member of the transaction processing system, one of the home-use terminals generating a request for a desired transaction and sending the transaction processing center information for applying for admission to become a member of the transaction processing system, the transaction processing center checking the request for the desired transaction to determine whether or not the request for the desired transaction is acceptable and checking the information for applying for admission to determine whether or not an application for admission is acceptable, the transaction processing center updating the information broadcast prior to receipt of the request from one of the plurality of home-use terminals and common to the plurality of home-use terminals, each of the home-use terminals comprising:

a first unit receiving the broadcasted television and related teletext signals, editing the received teletext signal into a predetermined format, the edited and displayed teletext signal providing a list of transaction items respectively representing the plurality of transactions, each transaction item being selectable by a corresponding input to said home-use terminal by a user thereof, and displaying an image of the television signal and an image of the edited teletext signal on the television set;

a second unit for generating a request for a desired transaction of the plurality of transactions related to the information of the teletext signal broadcasted by the broadcasting station, the request including information related to the desired transaction;

a third unit communicating with the transaction processing center via the communications network, the request for the desired transaction being sent to the transaction processing center by the third unit via the communications network; and a fourth unit reading the application-for-admission program stored on the card and sending the transaction processing center information for applying for admission to become a member of the transaction processing system in accordance with the application-for-admission program read from the card and, when the request for the desired transaction is acceptable, the transaction processing center updating the information included in the broadcasted teletext signal in accordance with the request for the desired transaction and forming an updated teletext signal that is broadcast by the transaction processing center, the updated teletext signal including new information, with the updated teletext signal being received by each of the home-use terminals.

25. The transaction processing system as claimed in claim 1, wherein the first unit further comprises a unit which displays, on the television set, the image of the teletext signal on the image of the television signal in a telop formation.

26. The home-use terminal as claimed in claim 20, further comprising a unit which displays, on the television set, the image of the teletext signal on the image of the television signal in a telop formation.

27. The transaction processing system as claimed in claim 24, wherein, in each of the home use terminals:

the second unit receives a selection input from the user designating a predetermined condition which must be satisfied for display of teletext data of a transaction item selected by the user; and the home use terminal further comprises a controller which compares the teletext data of the selected transaction item with the predetermined condition for determining whether to display the teletext data for viewing by the user.

28. A transaction processing system responsive to a broadcasting station broadcasting a teletext signal through the air, the teletext signal including information relating to a plurality of transactions, the transaction processing system comprising:

a plurality of home terminals receiving the teletext signal, editing the received teletext signal into a predetermined format and displaying same, the edited and displayed teletext signal providing a list of transaction items respectively representing the plurality of transactions, each transaction item being selectable by a corresponding input to said home-use terminal by a user thereof, displaying the plurality of transactions related to the information of the edited teletext signal, selecting a respective transaction of the plurality of transactions, and producing a request signal indicating the selected transaction, the teletext signal including information necessary for a transaction common to the plurality of home terminals;

a transaction processing center updating the information broadcast prior to receipt of the request signal from one of the home terminals and common to the plurality of home terminals; and a communication network connecting each of the home terminals to the transaction processing center via communication lines without transmitting signals directly between the home terminal and the transaction processing center through the air, wherein one of the home terminals transmits the request signal to the transaction processing center through the communication network, and the transaction processing center receives the request signal transmitted through the communication network and causes the information of the teletext signal to be updated based on the received request signal and forms an updated teletext signal that is broadcast by the transaction processing center, the updated teletext signal including new information, with the updated teletext signal being received by each of the home-use terminals.

29. A transaction processing system responsive to a broadcasting station broadcasting a television signal and a related teletext signal, the teletext signal including information relating to a plurality of transactions, the transaction processing system comprising:

a plurality of home-use terminals;

a transaction processing center; and a communications network connecting each of the home-use terminals and the transaction processing center, wherein each of the home-use terminals comprises a first unit receiving the broadcasted television and related teletext signals from the broadcasting station, editing the received teletext signal into a predetermined format, the edited and displayed teletext signal providing a list of transaction items respectively representing the plurality of transactions, each transaction item being selectable by a corresponding input to said home-use terminal by a user thereof, and displaying an image of the television signal and an image of the edited teletext signal, a second unit for generating a request for a desired transaction of the plurality of transactions relating to the information of the teletext signal broadcasted by the broadcasting station, the request including information related to the desired transaction, and a third unit communicating with the transaction processing center via the communications network, the request for the desired transaction being sent to the transaction processing center by the third unit via the communications network, and the transaction processing center comprising a checking unit checking the request for the desired transaction to determine whether or not the request for the desired transaction is acceptable and, when the request is acceptable, the transaction processing center updating the information included in the broadcasted teletext signal in accordance with the request to form an updated teletext signal that is broadcast by the transaction processing center, the updated teletext signal including new information, with the updated teletext signal being received by each of the home-use terminals.

30. A transaction processing system as claimed in claim 29, wherein a plurality of programs respectively correspond to the plurality of transactions and a plurality of cards each stores a respective program of the plurality of programs, the home-use terminal comprising a fourth unit reading the program stored on a respective card when the second unit generates the request for the desired transaction.

31. The transaction processing system as claimed in claim 29, wherein the first unit comprises a superimposing unit superimposing the image of the teletext signal on the image of the television signal.

32. The transaction processing system as claimed in claim 29, wherein the first unit comprises display means for selectively displaying one of the image of the television signal and the image of the teletext signal.

33. The transaction processing system as claimed in claim 29, wherein, in each of the home use terminals:
the second unit receives a selection input from the user designating a predetermined condition which must be satisfied for display of teletext data of a transaction item selected by the user; and
the home use terminal further comprises a controller which compares the teletext data of the selected transaction item with the predetermined condition for determining whether to display the teletext data for viewing by the user.

34. A transaction processing system responsive to a broadcasting station broadcasting a television signal and a related teletext signal, the transaction processing system comprising:
a plurality of home-use terminals, each including:
a first unit receiving the television and related teletext signals from the broadcasting station, editing the received teletext signal into a predetermined format, the edited and displayed teletext signal providing a list of transaction items respectively representing the plurality of transactions, each transaction item being selectable by a corresponding input to said home-use terminal by a user thereof, and displaying an image of the television signal and an image of the edited teletext signal, and
a second unit for generating a request for a desired transaction relating to the information of the teletext signal broadcasted by the broadcasting station, and
transaction processing center to update information included in the broadcasted teletext signal in accordance with the request.

35. The transaction processing system as claimed in claim 34, wherein, in each of the have use terminals:
the second unit receives a selection input from the user designating a predetermined condition which must be satisfied for display of teletext data of a transaction item selected by the user; and the house use terminal further comprises a controller which compares the teletext data of the selected transaction item with the predetermined condition for determining whet her to display the teletext data for viewing by the user.

36. A terminal, comprising:
a receiver receiving a broadcasted teletext signal representing transaction information; and
a data processor coupled to said receiver, receiving teletext data provided by the teletext signal and editing the received teletext data into a predetermined format for display thereof as a list of transaction items each selectable by a corresponding user input, and generating a transaction request responsive to a user's request input indicating a corresponding transaction item selected from the displayed list, the teletext data being displayed according to a predetermined format selected by the user of said terminal for display of selected teletext data in accordance with a predetermined condition.

37. A terminal as claimed in claim 36, wherein the predetermined format is a superimposing mode format whereby the selected teletext data are displayed as text superimposed over a video image from a video signal.

38. A terminal as claimed in claim 36, further comprising a controller receiving a selection input from the user, the selection input indicating at least one of the predetermined format, a data category for selecting the selected teletext data, and the predetermined condition for determining whether to display the selected teletext data in the predetermined format.

39. A terminal as claimed in claim 38, wherein:
the selection input includes condition data indicating the predetermined condition; and
the controller compares the condition data to the selected teletext data, determines whether the predetermined condition is satisfied for the selected teletext data, and controls a display to display the selected teletext data on a display unit in the predetermined format when the predetermined condition is satisfied.

40. A transaction processing center of a transaction processing system producing a teletext signal to be broadcast with a related television signal to one or more users, the teletext signal including information relating to a plurality of transactions selectable by a user by a selection signal transmitted by the user over a network to the transaction processing center, the transaction processing center comprising:
a receiver/transmitter unit having a terminal connectable to the network for receiving a selection signal transmitted over the network by a user and indicating a selection, by the user, of one of a plurality of transactions of a current, broadcasted teletext signal; and
a controller checking acceptability of the selected transaction and, if acceptable, performing the selected transaction and updating the teletext signal based on which the user-selected transaction was performed and, in accordance with the performance of the user-selected transaction, outputting the updated teletext signal as the teletext signal to be broadcasted currently to the one or more users.

41. A transaction processing center as recited in claim 40, further comprising:
a broadcasting station connectable over the network to the transaction processing center for receiving therefrom, and broadcasting, the television and related teletext signals to the one or more users.

42. The transaction processing center as claimed in claim 40, further comprising:
- a member information file storing identification data of plural users having network connections thereto and authorized to issue selection signals to the receiver/transmitter unit to request corresponding, specific transactions; and
- a comparator comparing identification information of a user, transmitted with a respective selection signal from the user, with the corresponding identification data of the member information file to determine if the user is authorized to issue the selection signal.

43. The transaction processing center as claimed in claim 40, wherein the transaction processing system comprises a plurality of user terminals with respective television sets for displaying the television and related teletext signals to the respective users.

44. A user terminal of a transaction processing system which receives broadcasted television and related teletext signals, the teletext signal including information relating to a plurality of transactions selectable by a user of the terminal by a selection signal selected by the user and transmitted by the user terminal over a network to a transaction processing center of the transaction processing system, the user terminal comprising:
- a receiver receiving broadcasted television and related teletext signals;
- a processor editing a teletext signal received by the receiver for display in a format enabling selection by a user of one of a plurality of transactions;
- a user identification and selection unit responsive to user identification information and transaction selection information, input by the user, to specify a user selection of a transaction of a plurality of transactions of a currently received teletext signal;
- a communications controller having an output connectable over a network to a transaction processing center of the transaction processing system; and
- the processor, in response to the selection information input provided by the user, identifying the transaction selected by the user and controlling the communications controller to transmit the user selection from the output thereof to the network.

45. The user terminal as claimed in claim 44, wherein:
- the communications controller, in response to an acknowledgment signal received from the transaction processing center over the network, designating the acceptance of the user selection thereby; and
- the processor, in response to the acknowledgment signal, produces an acknowledgment display signal for display of the acknowledgment to the user.

46. The user terminal as recited in claim 44, wherein:
- the teletext signal includes information relating to various programs, each program having respective, different types of selectable transactions; and
- the user identification and selection unit identifies a program selection of the user; and
- the processor, in response to the program selection of the user, compares the program selection of the user with the program information of the teletext signal, to determine whether a matching program exists for display to the user, in the edited format enabling selection by the user of one of the plurality of transactions of the selected programs.

47. A user terminal as claimed in claim 44, further comprising:
- a controller receiving a selection input from the user, the selection input indicating at least one of a predetermined format, a data category for selecting the selected teletext data, and a condition for determining whether to display the selected teletext data in the format.

48. A user terminal as claimed in claim 47, wherein:
- the selection input includes condition data indicating the predetermined condition; and
- the controller compares the condition data to the selected teletext data, determines whether the predetermined condition is satisfied for the selected teletext data, and controls a display to display the selected teletext data on a display unit in the predetermined format when the predetermined condition is satisfied.

* * * * *

UNITED STATES PATENT AND TRADEMARK OFFICE
CERTIFICATE OF CORRECTION

PATENT NO. : 6,091,823
DATED : July 18, 2000
INVENTOR(S) : Hironori Hosomi et al.

Page 1 of 1

It is certified that error appears in the above-identified patent and that said Letters Patent is hereby corrected as shown below:

Title page,
Item [54], change "SYSTEMS" (third occurrence) to -- SYSTEM --.

Column 18,
Lines 33-36, delete ", the request ...communications network."

Signed and Sealed this

Eleventh Day of September, 2001

Attest:

NICHOLAS P. GODICI
Attesting Officer    Acting Director of the United States Patent and Trademark Office